United States Patent
Kupermann et al.

(10) Patent No.: US 9,684,360 B2
(45) Date of Patent: Jun. 20, 2017

(54) DYNAMICALLY CONTROLLING POWER MANAGEMENT OF AN ON-DIE MEMORY OF A PROCESSOR

(71) Applicant: Intel Corporation, Santa Clara, CA (US)

(72) Inventors: Eli Kupermann, Maale Adumim (IL); Elena Agranovsky, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 164 days.

(21) Appl. No.: 14/528,076

(22) Filed: Oct. 30, 2014

(65) Prior Publication Data

US 2016/0124490 A1    May 5, 2016

(51) Int. Cl.
*G06F 1/32*    (2006.01)

(52) U.S. Cl.
CPC .......... *G06F 1/3275* (2013.01); *G06F 1/3225* (2013.01)

(58) Field of Classification Search
CPC ..... G06F 1/3287; G06F 1/3275; G06F 1/3278
See application file for complete search history.

(56) References Cited

U.S. PATENT DOCUMENTS

| | | |
|---|---|---|
| 5,163,153 A | 11/1992 | Cole et al. |
| 5,522,087 A | 5/1996 | Hsiang |
| 5,590,341 A | 12/1996 | Matter |
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |

(Continued)

FOREIGN PATENT DOCUMENTS

EP    1 282 030 A1    5/2003

OTHER PUBLICATIONS

Intel Developer Forum, IDF2010, Opher Kahn, et al., "Intel Next Generation Microarchitecture Codename Sandy Bridge: New Processor Innovations," Sep. 13, 2010, 58 pages.

(Continued)

*Primary Examiner* — Dennis M Butler
(74) *Attorney, Agent, or Firm* — Trop, Pruner & Hu, P.C.

(57) ABSTRACT

In one embodiment, a processor comprises: at least one core to execute instructions; a memory coupled to the at least one core, the memory including a plurality of pages to store information; and a page manager coupled to the memory, the page manager to access metadata of a page table entry associated with a page of the memory and update usage information of an entry of a database, the entry of the database associated with the page of the memory. The page manager may cause at least a portion of the memory to be dynamically powered down based at least in part on the usage information. Other embodiments are described and claimed.

16 Claims, 21 Drawing Sheets

(56) References Cited

U.S. PATENT DOCUMENTS

| | | |
|---|---|---|
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0034234 A1* | 2/2008 | Shimizu ............... G06F 1/3225 713/320 |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0222620 A1* | 9/2009 | Kanai ................... G06F 1/3225 711/104 |
| 2009/0235105 A1 | 9/2009 | Branover et al. |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2011/0283071 A1* | 11/2011 | Yokoya ................ G06F 1/3275 711/162 |
| 2012/0079290 A1 | 3/2012 | Kumar |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0326252 A1* | 12/2013 | Ise ....................... G06F 1/3234 713/323 |
| 2014/0068290 A1 | 3/2014 | Bhandaru et al. |

OTHER PUBLICATIONS

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scaling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

Intel Corporation, "Intel 64 and IA-32 Architectures Software Developer's Manual," vol. 3 (3A, 3B & 3C): System Programming Guide, Feb. 2014, Chapter 14 Power and Thermal Management (14.1-14.9.5), 44 pages.

* cited by examiner

DYNAMICALLY CONTROLLING POWER MANAGEMENT OF AN ON-DIE MEMORY OF A PROCESSOR

TECHNICAL FIELD

Embodiments relate to power management techniques.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems. That is, disclosed embodiments can be used in many different system types, ranging from server computers (e.g., tower, rack, blade, micro-server and so forth), communications systems, storage systems, desktop computers of any configuration, laptop, notebook, and tablet computers (including 2:1 tablets, phablets and so forth), and may be also used in other devices, such as handheld devices, systems on chip (SoCs), and embedded applications. Some examples of handheld devices include cellular phones such as smartphones, Internet protocol devices, digital cameras, personal digital assistants (PDAs), and handheld PCs. Embedded applications may typically include a microcontroller, a digital signal processor (DSP), network computers (NetPC), set-top boxes, network hubs, wide area network (WAN) switches, wearable devices, or any other system that can perform the functions and operations taught below. More so, embodiments may be implemented in mobile terminals having standard voice functionality such as mobile phones, smartphones and phablets, and/or in non-mobile terminals without a standard wireless voice function communication capability, such as many wearables, tablets, notebooks, desktops, micro-servers, servers and so forth. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future, such as for power conservation and energy efficiency in products that encompass a large portion of the US economy.

Figure 1:
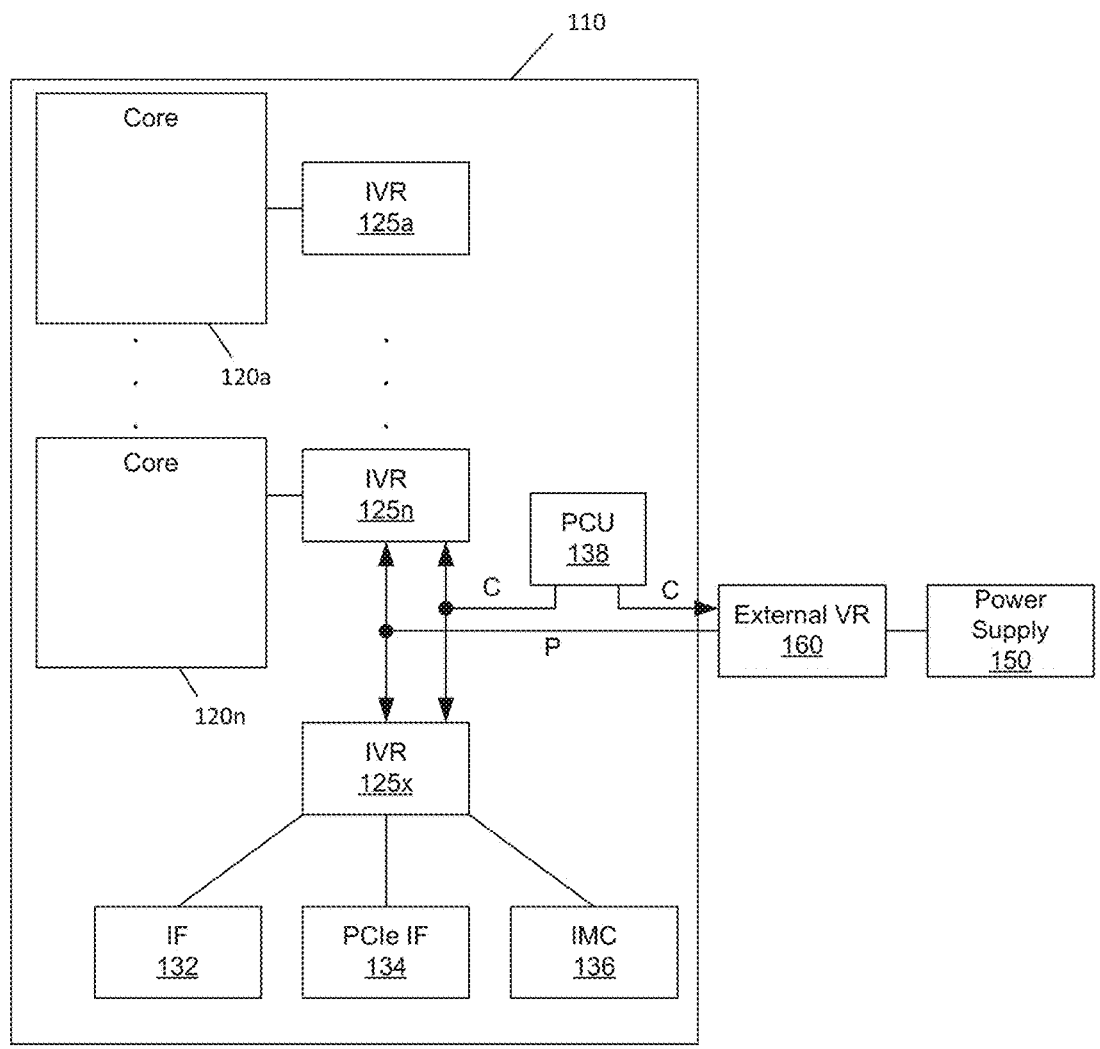
FIG. 1 is a block diagram of a portion of a system in accordance with an embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_n$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be enable operation for an Intel® Quick Path Interconnect (QPI) interconnect, which provides for point-to-point (PtP) links in a cache coherent protocol that includes multiple layers including a physical layer, a link layer and a protocol layer. In turn, interface 134 may communicate via a Peripheral Component Interconnect Express (PCIe™) protocol.

Also shown is a power control unit (PCU) 138, which may include hardware, software and/or firmware to perform power management operations with regard to processor 110. As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include a variety of power management logic units to perform hardware-based power management. Such power management may be wholly processor controlled (e.g., by various processor hardware, and which may be triggered by workload and/or power, thermal or other processor constraints) and/or the power management may be performed responsive to external sources (such as a platform or management power management source or system software). In some embodiments, PCU 138 may trigger internal memory management logic to perform power management operations with respect to one or more internal memories, such as a cache memory associated with an integrated sensor hub (not shown for ease of illustration in FIG. 1).

While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, the OSPM mechanism specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle. Although described with these particular examples, understand that many other power management techniques may be used in particular embodiments.

Figure 2:
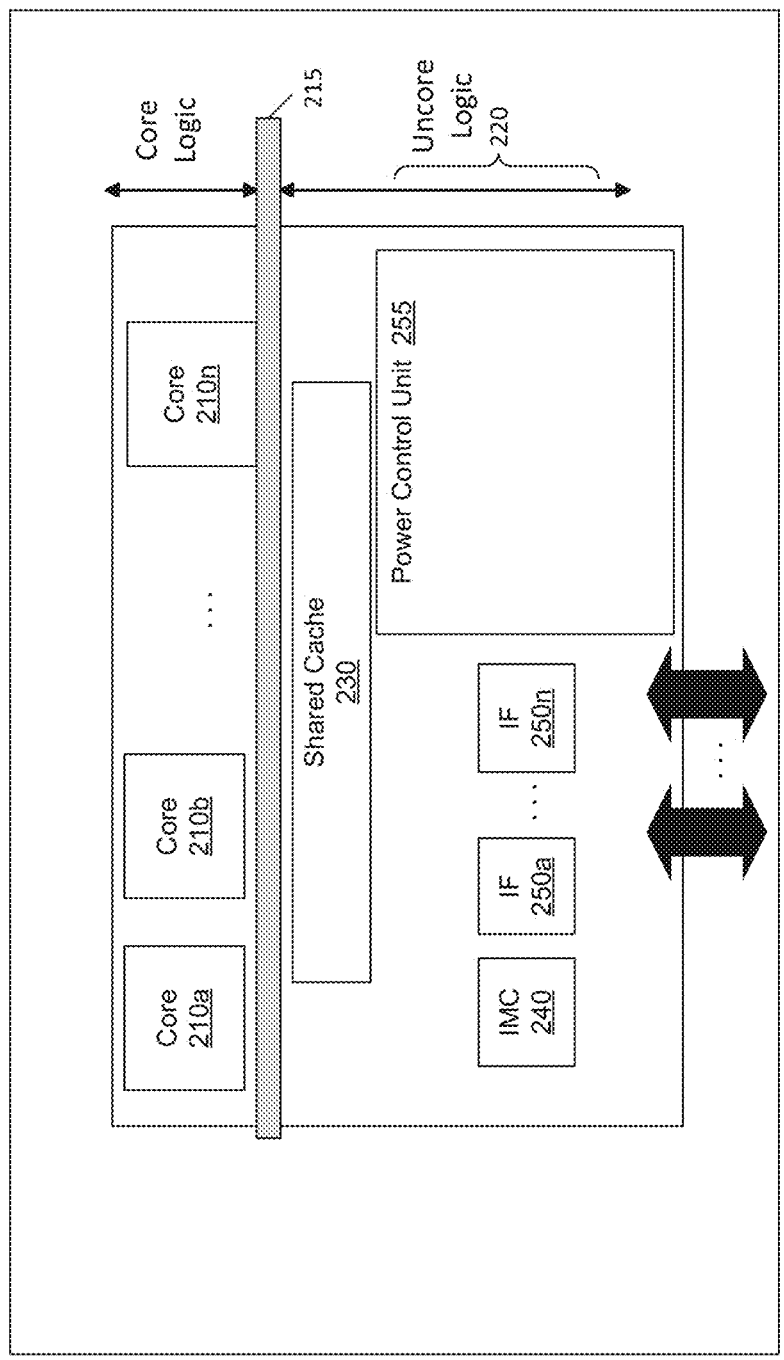
FIG. 2 is a block diagram of a processor in accordance with an embodiment of the present invention.

Embodiments can be implemented in processors for various markets including server processors, desktop processors, mobile processors and so forth. Referring now to FIG. 2, shown is a block diagram of a processor in accordance with an embodiment of the present invention. As shown in FIG. 2, processor 200 may be a multicore processor including a plurality of cores $210_a$-$210_n$. In one embodiment, each such core may be of an independent power domain and can be configured to enter and exit active states and/or maximum performance states based on workload. The various cores may be coupled via an interconnect 215 to a system agent or uncore 220 that includes various components. As seen, the uncore 220 may include a shared cache 230 which may be a last level cache. In addition, the uncore may include an integrated memory controller 240 to communicate with a system memory (not shown in FIG. 2), e.g., via a memory bus. Uncore 220 also includes various interfaces 250 and a power control unit 255, which may include logic to perform the power management techniques described herein. Uncore 220 may further include an integrated sensor hub (not shown in FIG. 2) having an associated memory (which may be separate from shared cache 230), a size of which can be dynamically controlled as described herein to reduce power consumption.

In addition, by interfaces 250a-250n, connection can be made to various off-chip components such as peripheral devices, mass storage and so forth. While shown with this particular implementation in the embodiment of FIG. 2, the scope of the present invention is not limited in this regard.

Figure 3:
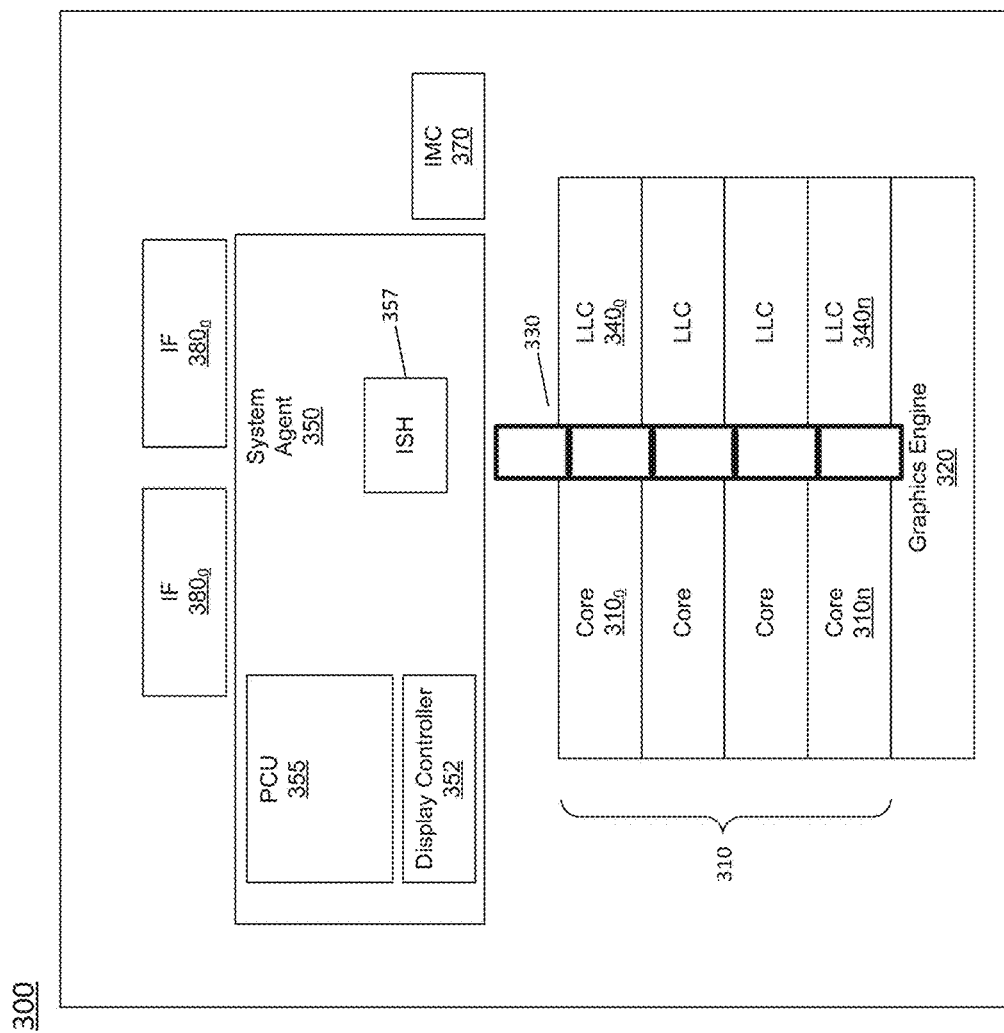
FIG. 3 is a block diagram of a multi-domain processor in accordance with another embodiment of the present invention.

Referring now to FIG. 3, shown is a block diagram of a multi-domain processor in accordance with another embodiment of the present invention. As shown in the embodiment of FIG. 3, processor 300 includes multiple domains. Specifically, a core domain 310 can include a plurality of cores $310_0$-$310_n$, a graphics domain 320 can include one or more graphics engines, and a system agent domain 350 may further be present. In some embodiments, system agent domain 350 may execute at an independent frequency than the core domain and may remain powered on at all times to handle power control events and power management such that domains 310 and 320 can be controlled to dynamically enter into and exit high power and low power states. Each of domains 310 and 320 may operate at different voltage and/or power. Note that while only shown with three domains, understand the scope of the present invention is not limited in this regard and additional domains can be present in other embodiments. For example, multiple core domains may be present each including at least one core.

In general, each core 310 may further include low level caches in addition to various execution units and additional processing elements. In turn, the various cores may be coupled to each other and to a shared cache memory formed of a plurality of units of a last level cache (LLC) $340_0$-$340_n$. In various embodiments, LLC 340 may be shared amongst the cores and the graphics engine, as well as various media processing circuitry. As seen, a ring interconnect 330 thus couples the cores together, and provides interconnection between the cores, graphics domain 320 and system agent circuitry 350. In one embodiment, interconnect 330 can be part of the core domain. However in other embodiments the ring interconnect can be of its own domain.

As further seen, system agent domain 350 may include display controller 352 which may provide control of and an interface to an associated display. An integrated sensor hub 357 may be an interface with a plurality of off-chip sensors of a given platform such as environmental sensors, among others. In an embodiment, a platform may include one or more sensors including a touchpad, a touchscreen, an accelerometer, a gyrometer, a magnetometer, a global positioning system device, an ambient light sensor, a proximity sensor, a barometer, a hygrometer, a thermometer, and a real time clock device. System agent domain 350 also includes a power control unit 355 which can include logic to perform the power management techniques described herein, including logic to trigger dynamic control of a size of an internal memory used by an integrated sensor hub, e.g., based on usage characteristics.

As further seen in FIG. 3, processor 300 can further include an integrated memory controller (IMC) 370 that can provide for an interface to a system memory, such as a dynamic random access memory (DRAM). Multiple interfaces $380_0$-$380_n$ may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 3, understand the scope of the present invention is not limited in this regard.

Figure 4:
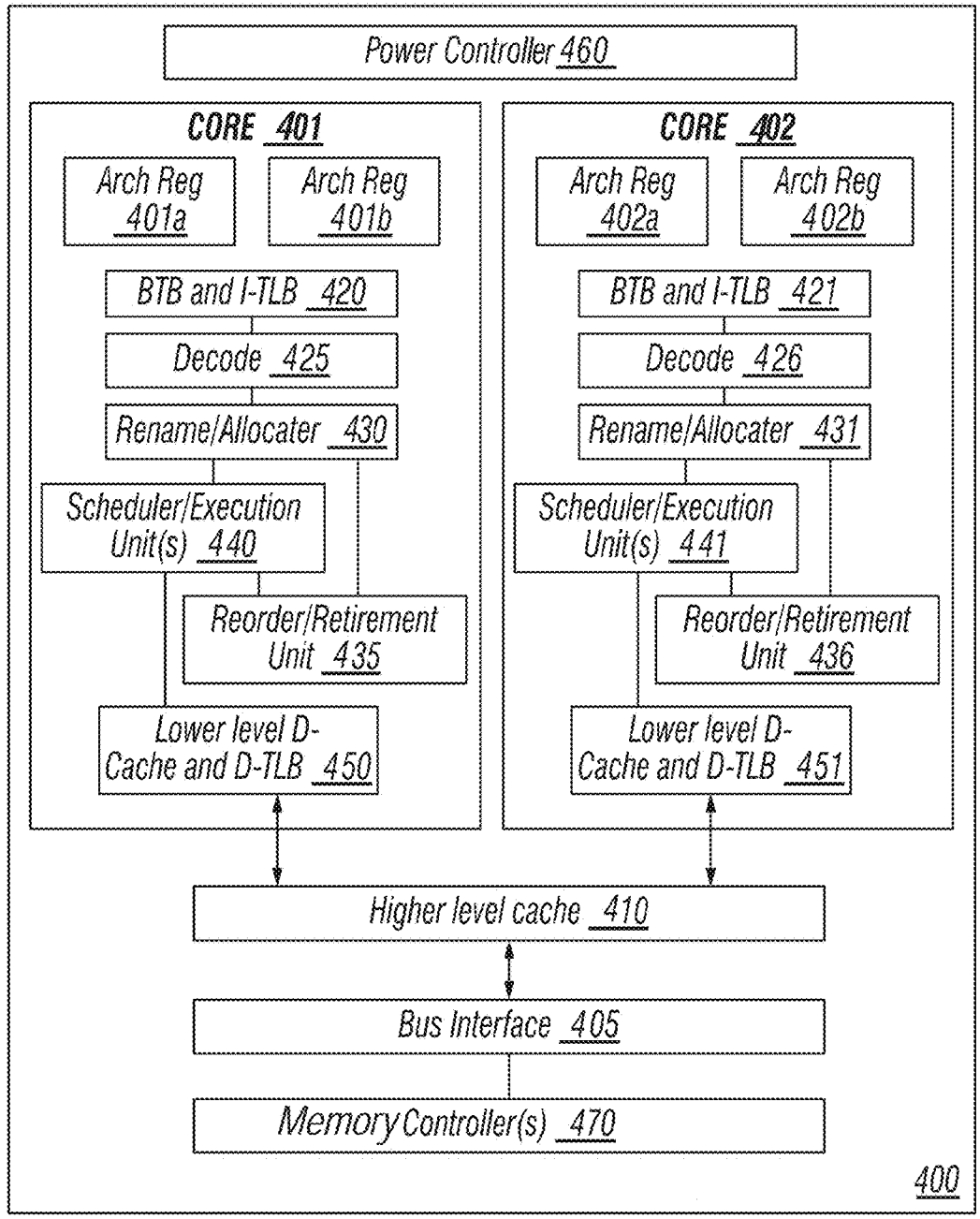
FIG. 4 is an embodiment of a processor including multiple cores.

Referring to FIG. 4, an embodiment of a processor including multiple cores is illustrated. Processor 400 includes any processor or processing device, such as a microprocessor, an embedded processor, a digital signal processor (DSP), a network processor, a handheld processor, an application processor, a co-processor, a system on a chip (SoC), or other device to execute code. Processor 400, in one embodiment, includes at least two cores—cores 401 and 402, which may include asymmetric cores or symmetric cores (the illustrated embodiment). However, processor 400 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 400, as illustrated in FIG. 4, includes two cores, cores 401 and 402. Here, cores 401 and 402 are considered symmetric cores, i.e., cores with the same configurations, functional units, and/or logic. In another embodiment, core 401 includes an out-of-order processor core, while core 402 includes an in-order processor core. However, cores 401 and 402 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 401 are described in further detail below, as the units in core 402 operate in a similar manner.

As depicted, core 401 includes two hardware threads 401a and 401b, which may also be referred to as hardware thread slots 401a and 401b. Therefore, software entities, such as an operating system, in one embodiment potentially view processor 400 as four separate processors, i.e., four logical processors or processing elements capable of executing four software threads concurrently. As alluded to above, a first thread is associated with architecture state registers 401a, a second thread is associated with architecture state registers 401b, a third thread may be associated with architecture state registers 402a, and a fourth thread may be associated with architecture state registers 402b. Here, each of the architecture state registers (401a, 401b, 402a, and 402b) may be referred to as processing elements, thread slots, or thread units, as described above. As illustrated, architecture state registers 401a are replicated in architecture state registers 401b, so individual architecture states/contexts are capable of being stored for logical processor 401a and logical processor 401b. In core 401, other smaller resources, such as instruction pointers and renaming logic in allocator and renamer block 430 may also be replicated for threads 401a and 401b. Some resources, such as re-order buffers in reorder/retirement unit 435, ILTB 420, load/store buffers, and queues may be shared through partitioning. Other resources, such as general purpose internal registers, page-table base register(s), low-level data-cache and data-TLB 415, execution unit(s) 440, and portions of out-of-order unit 435 are potentially fully shared.

Processor 400 often includes other resources, which may be fully shared, shared through partitioning, or dedicated by/to processing elements. In FIG. 4, an embodiment of a purely exemplary processor with illustrative logical units/resources of a processor is illustrated. Note that a processor may include, or omit, any of these functional units, as well as include any other known functional units, logic, or firmware not depicted. As illustrated, core 401 includes a simplified, representative out-of-order (OOO) processor core. But an in-order processor may be utilized in different embodiments. The OOO core includes a branch target buffer 420 to predict branches to be executed/taken and an instruction-translation buffer (I-TLB) 420 to store address translation entries for instructions.

Core 401 further includes decode module 425 coupled to fetch unit 420 to decode fetched elements. Fetch logic, in one embodiment, includes individual sequencers associated with thread slots 401a, 401b, respectively. Usually core 401 is associated with a first ISA, which defines/specifies instructions executable on processor 400. Often machine code instructions that are part of the first ISA include a portion of the instruction (referred to as an opcode), which references/specifies an instruction or operation to be performed. Decode logic 425 includes circuitry that recognizes these instructions from their opcodes and passes the decoded instructions on in the pipeline for processing as defined by the first ISA. For example, decoders 425, in one embodiment, include logic designed or adapted to recognize specific instructions, such as transactional instruction. As a result of the recognition by decoders 425, the architecture or core 401 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 430 includes an allocator to reserve resources, such as register files to store instruction processing results. However, threads 401a and 401b are potentially capable of out-of-order execution, where allocator and renamer block 430 also reserves other resources, such as reorder buffers to track instruction results. Unit 430 may also include a register renamer to rename program/instruction reference registers to other registers internal to processor 400. Reorder/retirement unit 435 includes components, such as the reorder buffers mentioned above, load buffers, and store buffers, to support out-of-order execution and later in-order retirement of instructions executed out-of-order.

Scheduler and execution unit(s) block 440, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 450 are coupled to execution unit(s) 440. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 401 and 402 share access to higher-level or further-out cache 410, which is to cache recently fetched elements. Note that higher-level or further-out refers to cache levels increasing or getting further away from the execution unit(s). In one embodiment, higher-level cache 410 is a last-level data cache—last cache in the memory hierarchy on processor 400—such as a second or third level data cache. However, higher level cache 410 is not so limited, as it may be associated with or includes an instruction cache. A trace cache—a type of instruction cache—instead may be coupled after decoder 425 to store recently decoded traces.

In the depicted configuration, processor 400 also includes bus interface module 405 and a power controller 460, which may perform power management in accordance with an embodiment of the present invention. In this scenario, bus interface 405 is to communicate with devices external to processor 400, such as system memory and other components.

A memory controller 470 may interface with other devices such as one or many memories. In an example, bus interface 405 includes a ring interconnect with a memory controller for interfacing with a memory and a graphics controller for interfacing with a graphics processor. In an SoC environment, even more devices, such as a network interface, coprocessors, memory, graphics processor, and any other known computer devices/interface may be integrated on a single die or integrated circuit to provide small form factor with high functionality and low power consumption.

Figure 5:
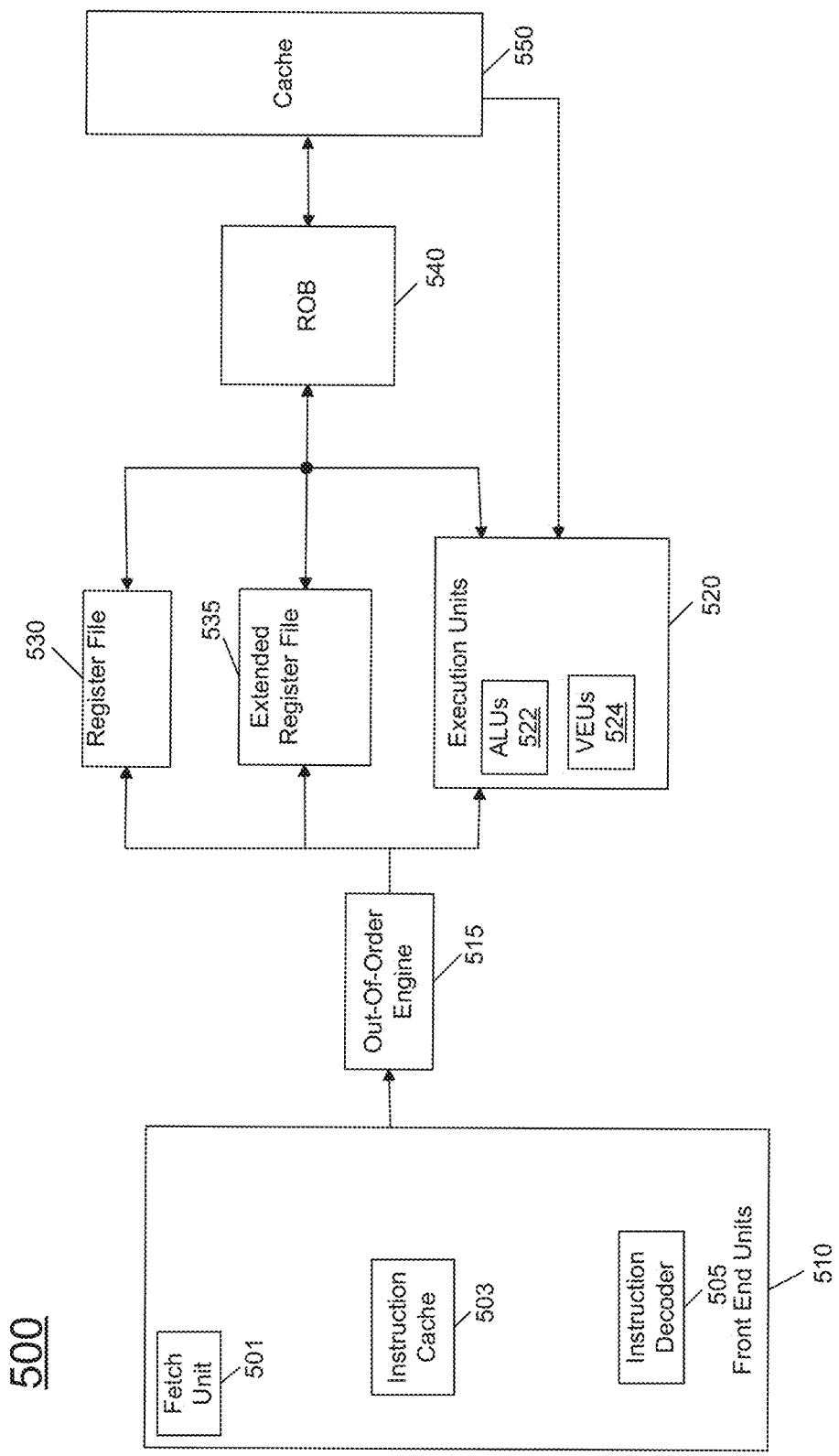
FIG. 5 is a block diagram of a micro-architecture of a processor core in accordance with one embodiment of the present invention.

Referring now to FIG. 5, shown is a block diagram of a micro-architecture of a processor core in accordance with one embodiment of the present invention. As shown in FIG. 5, processor core 500 may be a multi-stage pipelined out-of-order processor. Core 500 may operate at various voltages based on a received operating voltage, which may be received from an integrated voltage regulator or external voltage regulator.

As seen in FIG. 5, core 500 includes front end units 510, which may be used to fetch instructions to be executed and prepare them for use later in the processor pipeline. For example, front end units 510 may include a fetch unit 501, an instruction cache 503, and an instruction decoder 505. In some implementations, front end units 510 may further include a trace cache, along with microcode storage as well as a micro-operation storage. Fetch unit 501 may fetch macro-instructions, e.g., from memory or instruction cache 503, and feed them to instruction decoder 505 to decode them into primitives, i.e., micro-operations for execution by the processor.

Coupled between front end units 510 and execution units 520 is an out-of-order (OOO) engine 515 that may be used to receive the micro-instructions and prepare them for execution. More specifically OOO engine 515 may include various buffers to re-order micro-instruction flow and allocate various resources needed for execution, as well as to provide renaming of logical registers onto storage locations within various register files such as register file 530 and extended register file 535. Register file 530 may include separate register files for integer and floating point operations. Extended register file 535 may provide storage for vector-sized units, e.g., 256 or 512 bits per register.

Various resources may be present in execution units 520, including, for example, various integer, floating point, and single instruction multiple data (SIMD) logic units, among other specialized hardware. For example, such execution units may include one or more arithmetic logic units (ALUs) 522 and one or more vector execution units 524, among other such execution units.

Results from the execution units may be provided to retirement logic, namely a reorder buffer (ROB) 540. More specifically, ROB 540 may include various arrays and logic to receive information associated with instructions that are executed. This information is then examined by ROB 540 to determine whether the instructions can be validly retired and result data committed to the architectural state of the processor, or whether one or more exceptions occurred that prevent a proper retirement of the instructions. Of course, ROB 540 may handle other operations associated with retirement.

As shown in FIG. 5, ROB 540 is coupled to a cache 550 which, in one embodiment may be a low level cache (e.g., an L1 cache) although the scope of the present invention is not limited in this regard. Also, execution units 520 can be directly coupled to cache 550. From cache 550, data communication may occur with higher level caches, system memory and so forth. While shown with this high level in the embodiment of FIG. 5, understand the scope of the present invention is not limited in this regard. For example, while the implementation of FIG. 5 is with regard to an out-of-order machine such as of an Intel® x86 instruction set architecture (ISA), the scope of the present invention is not limited in this regard. That is, other embodiments may be implemented in an in-order processor, a reduced instruction set computing (RISC) processor such as an ARM-based processor, or a processor of another type of ISA that can emulate instructions and operations of a different ISA via an emulation engine and associated logic circuitry.

Figure 6:
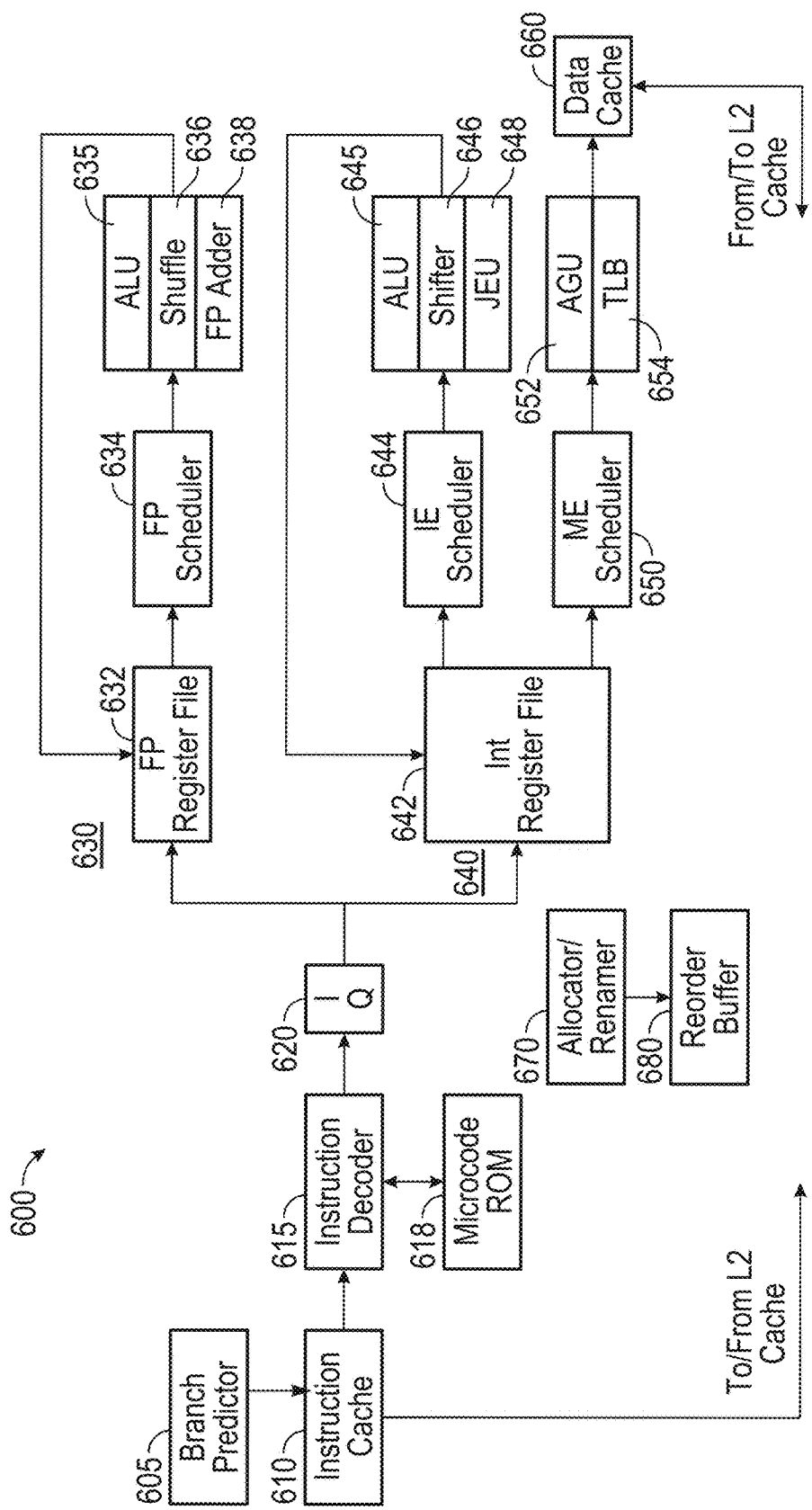
FIG. 6 is a block diagram of a micro-architecture of a processor core in accordance with another embodiment.

Referring now to FIG. 6, shown is a block diagram of a micro-architecture of a processor core in accordance with another embodiment. In the embodiment of FIG. 6, core 600 may be a low power core of a different micro-architecture, such as an Intel® Atom™-based processor having a relatively limited pipeline depth designed to reduce power consumption. As seen, core 600 includes an instruction cache 610 coupled to provide instructions to an instruction decoder 615. A branch predictor 605 may be coupled to instruction cache 610. Note that instruction cache 610 may further be coupled to another level of a cache memory, such as an L2 cache (not shown for ease of illustration in FIG. 6). In turn, instruction decoder 615 provides decoded instructions to an issue queue 620 for storage and delivery to a given execution pipeline. A microcode ROM 618 is coupled to instruction decoder 615.

A floating point pipeline 630 includes a floating point register file 632 which may include a plurality of architectural registers of a given bit with such as 128, 256 or 512 bits. Pipeline 630 includes a floating point scheduler 634 to schedule instructions for execution on one of multiple execution units of the pipeline. In the embodiment shown, such execution units include an ALU 635, a shuffle unit 636, and a floating point adder 638. In turn, results generated in these execution units may be provided back to buffers and/or registers of register file 632. Of course understand while shown with these few example execution units, additional or different floating point execution units may be present in another embodiment.

An integer pipeline 640 also may be provided. In the embodiment shown, pipeline 640 includes an integer register file 642 which may include a plurality of architectural registers of a given bit with such as 128 or 256 bits. Pipeline 640 includes an integer scheduler 644 to schedule instructions for execution on one of multiple execution units of the pipeline. In the embodiment shown, such execution units include an ALU 645, a shifter unit 646, and a jump execution unit 648. In turn, results generated in these execution units may be provided back to buffers and/or registers of register file 642. Of course understand while shown with these few example execution units, additional or different integer execution units may be present in another embodiment.

A memory execution scheduler 650 may schedule memory operations for execution in an address generation unit 652, which is also coupled to a TLB 654. As seen, these structures may couple to a data cache 660, which may be a L0 and/or L1 data cache that in turn couples to additional levels of a cache memory hierarchy, including an L2 cache memory.

To provide support for out-of-order execution, an allocator/renamer 670 may be provided, in addition to a reorder buffer 680, which is configured to reorder instructions executed out of order for retirement in order. Although shown with this particular pipeline architecture in the illustration of FIG. 6, understand that many variations and alternatives are possible.

Note that in a processor having asymmetric cores, such as in accordance with the micro-architectures of FIGS. 5 and 6, workloads may be dynamically swapped between the cores for power management reasons, as these cores, although having different pipeline designs and depths, may be of the same or related ISA. Such dynamic core swapping may be performed in a manner transparent to a user application (and possibly kernel also).

Figure 7:
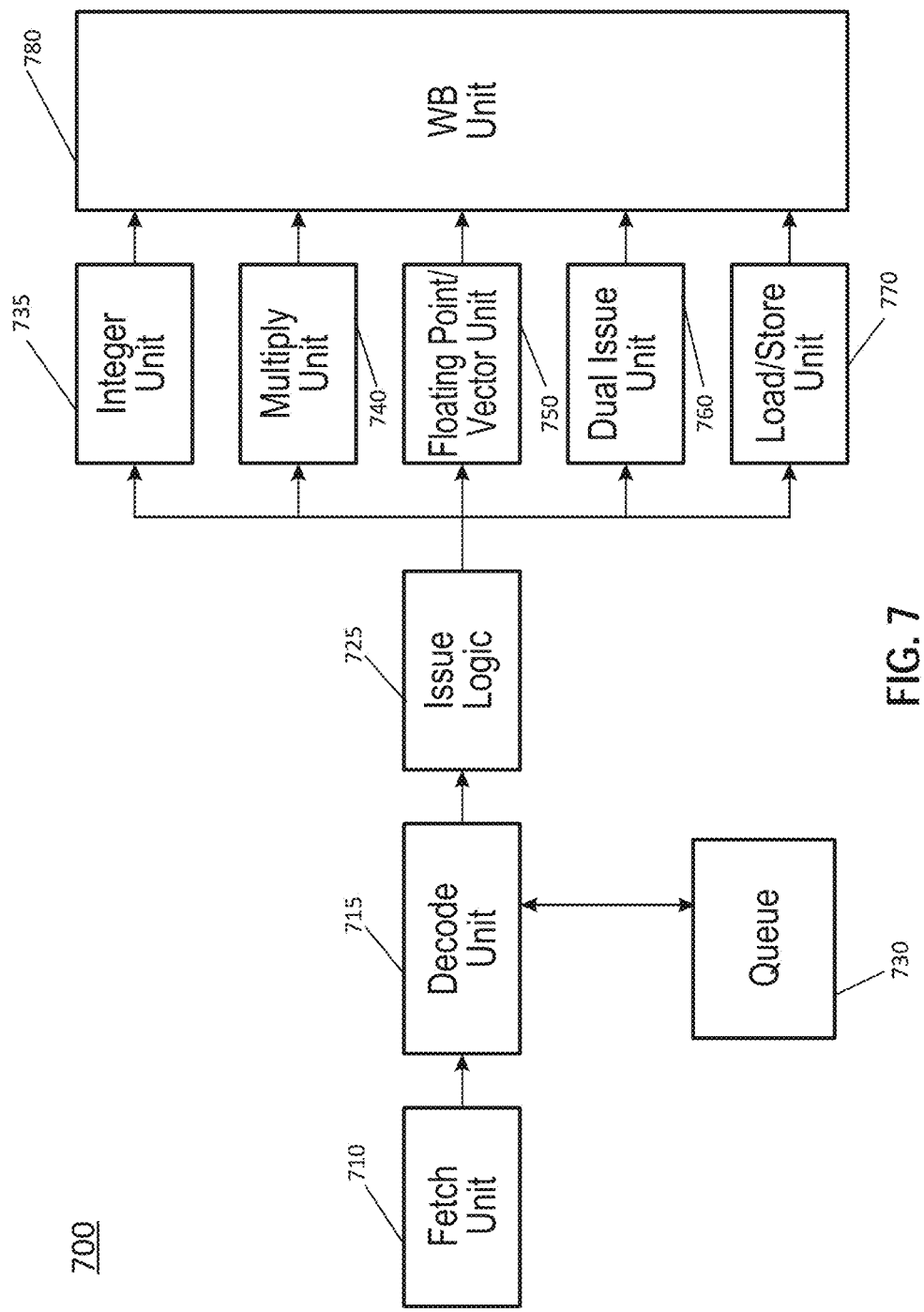
FIG. 7 is a block diagram of a micro-architecture of a processor core in accordance with yet another embodiment.

Referring to FIG. 7, shown is a block diagram of a micro-architecture of a processor core in accordance with yet another embodiment. As illustrated in FIG. 7, a core 700 may include a multi-staged in-order pipeline to execute at very low power consumption levels. As one such example, processor 700 may have a micro-architecture in accordance with an ARM Cortex A53 design available from ARM Holdings, LTD., Sunnyvale, Calif. In an implementation, an 8-stage pipeline may be provided that is configured to execute both 32-bit and 64-bit code. Core 700 includes a fetch unit 710 that is configured to fetch instructions and provide them to a decode unit 715, which may decode the instructions, e.g., macro-instructions of a given ISA such as an ARMv8 ISA. Note further that a queue 730 may couple to decode unit 715 to store decoded instructions. Decoded instructions are provided to an issue logic 725, where the decoded instructions may be issued to a given one of multiple execution units.

With further reference to FIG. 7, issue logic 725 may issue instructions to one of multiple execution units. In the embodiment shown, these execution units include an integer unit 735, a multiply unit 740, a floating point/vector unit 750, a dual issue unit 760, and a load/store unit 770. The results of these different execution units may be provided to a writeback unit 780. Understand that while a single writeback unit is shown for ease of illustration, in some implementations separate writeback units may be associated with each of the execution units. Furthermore, understand that while each of the units and logic shown in FIG. 7 is represented at a high level, a particular implementation may include more or different structures. A processor designed using one or more cores having a pipeline as in FIG. 7 may be implemented in many different end products, extending from mobile devices to server systems.

Figure 8:
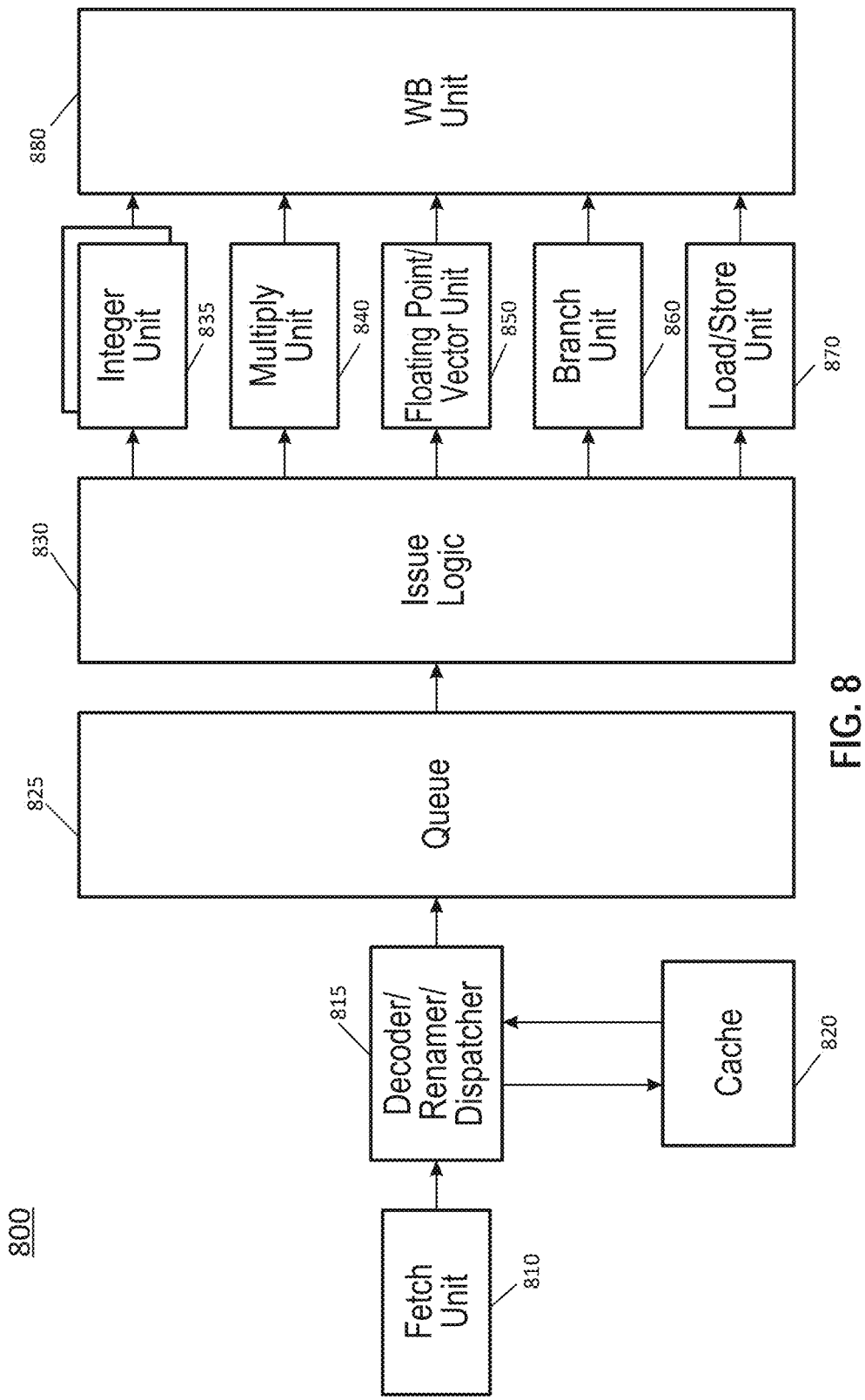
FIG. 8 is a block diagram of a micro-architecture of a processor core in accordance with a still further embodiment.

Referring to FIG. 8, shown is a block diagram of a micro-architecture of a processor core in accordance with a still further embodiment. As illustrated in FIG. 8, a core 800 may include a multi-stage multi-issue out-of-order pipeline to execute at very high performance levels (which may occur at higher power consumption levels than core 700 of FIG. 7). As one such example, processor 800 may have a microarchitecture in accordance with an ARM Cortex A57 design. In an implementation, a 15 (or greater)-stage pipeline may be provided that is configured to execute both 32-bit and 64-bit code. In addition, the pipeline may provide for 3 (or greater)-wide and 3 (or greater)-issue operation. Core 800 includes a fetch unit 810 that is configured to fetch instructions and provide them to a decoder/renamer/dispatcher 815, which may decode the instructions, e.g., macro-instructions of an ARMv8 instruction set architecture, rename register references within the instructions, and dispatch the instructions (eventually) to a selected execution unit. Decoded instructions may be stored in a queue 825. Note that while a single queue structure is shown for ease of illustration in FIG. 8, understand that separate queues may be provided for each of the multiple different types of execution units.

Also shown in FIG. 8 is an issue logic 830 from which decoded instructions stored in queue 825 may be issued to a selected execution unit. Issue logic 830 also may be implemented in a particular embodiment with a separate issue logic for each of the multiple different types of execution units to which issue logic 830 couples.

Decoded instructions may be issued to a given one of multiple execution units. In the embodiment shown, these execution units include one or more integer units 835, a multiply unit 840, a floating point/vector unit 850, a branch unit 860, and a load/store unit 870. In an embodiment, floating point/vector unit 850 may be configured to handle SIMD or vector data of 128 or 256 bits. Still further, floating point/vector execution unit 850 may perform IEEE-754 double precision floating-point operations. The results of these different execution units may be provided to a writeback unit 880. Note that in some implementations separate writeback units may be associated with each of the execution units. Furthermore, understand that while each of the units and logic shown in FIG. 8 is represented at a high level, a particular implementation may include more or different structures.

Note that in a processor having asymmetric cores, such as in accordance with the micro-architectures of FIGS. 7 and 8, workloads may be dynamically swapped for power management reasons, as these cores, although having different pipeline designs and depths, may be of the same or related ISA. Such dynamic core swapping may be performed in a manner transparent to a user application (and possibly kernel also).

Figure 9:
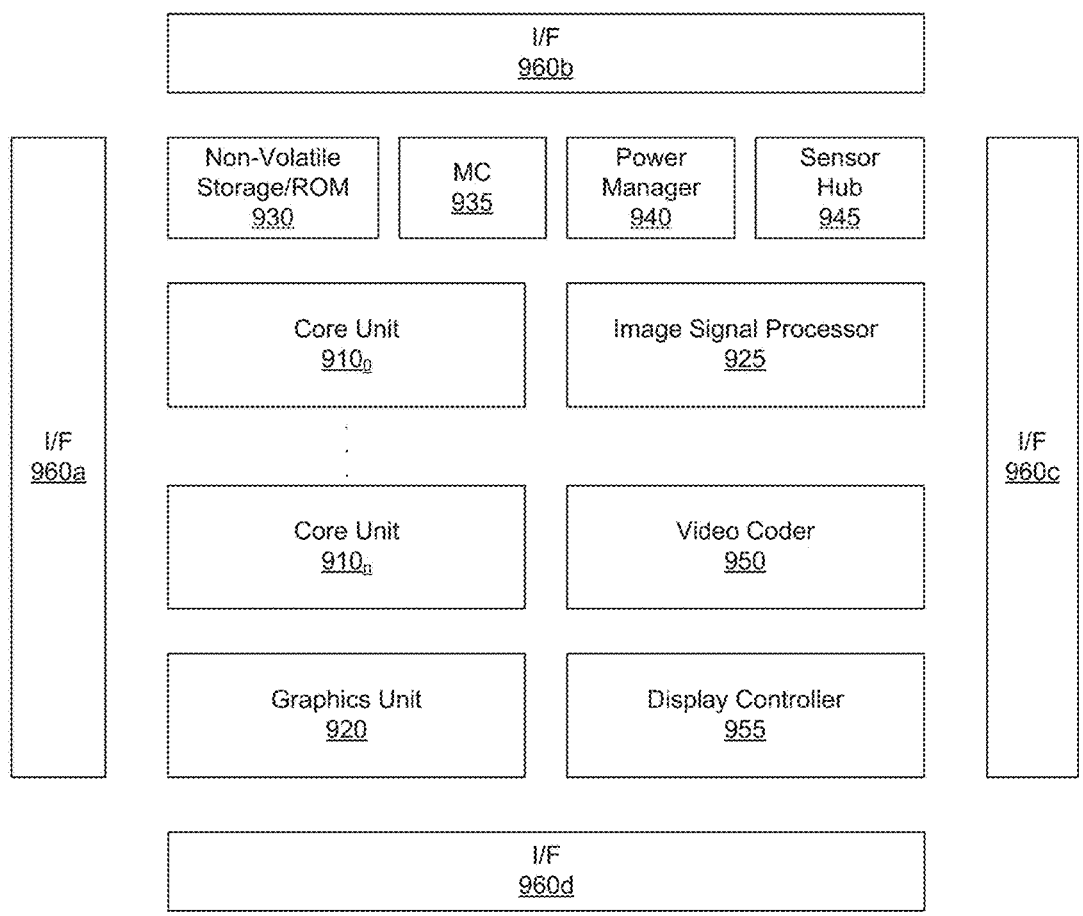
FIG. 9 is a block diagram of a processor in accordance with another embodiment of the present invention.

A processor designed using one or more cores having pipelines as in any one or more of FIGS. 5-8 may be implemented in many different end products, extending from mobile devices to server systems. Referring now to FIG. 9, shown is a block diagram of a processor in accordance with another embodiment of the present invention. In the embodiment of FIG. 9, processor 900 may be a SoC including multiple domains, each of which may be controlled to operate at an independent operating voltage and operating frequency. As a specific illustrative example, processor 900 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device.

In the high level view shown in FIG. 9, processor 900 includes a plurality of core units $910_0$-$910_n$. Each core unit may include one or more processor cores, one or more cache memories and other circuitry. Each core unit 910 may support one or more instructions sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level (L2) cache memory. A non-volatile storage 930 may be used to store various program and other data. For example, this storage may be used to store at least portions of microcode, boot information such as a BIOS, other system software or so forth.

Each core unit 910 may also include an interface such as a bus interface unit to enable interconnection to additional circuitry of the processor. In an embodiment, each core unit 910 couples to a coherent fabric that may act as a primary cache coherent on-die interconnect that in turn couples to a memory controller 935. In turn, memory controller 935 controls communications with a memory such as a DRAM (not shown for ease of illustration in FIG. 9).

In addition to core units, additional processing engines are present within the processor, including at least one graphics unit 920 which may include one or more graphics processing units (GPUs) to perform graphics processing as well as to possibly execute general purpose operations on the graphics processor (so-called GPGPU operation). In addition, at least one image signal processor 925 may be present. Signal processor 925 may be configured to process incoming image data received from one or more capture devices, either internal to the SoC or off-chip.

Other accelerators also may be present. In the illustration of FIG. 9, a video coder 950 may perform coding operations including encoding and decoding for video information, e.g., providing hardware acceleration support for high definition video content. A display controller 955 further may be provided to accelerate display operations including providing support for internal and external displays of a system. In addition, a sensor hub 945 may be present to perform interface operations for a number of off-chip sensors. In an embodiment, sensor hub 945 may include or be associated with a memory, which can be dynamically power managed (e.g., by control of an active or powered on portions of the memory) via a memory management logic of one or more of core units 910. Each of the units may have its power consumption controlled via a power manager 940, which may include control logic to perform the various power management techniques described herein.

In some embodiments, SoC 900 may further include a non-coherent fabric coupled to the coherent fabric to which various peripheral devices may couple. One or more interfaces 960a-960d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 9, understand the scope of the present invention is not limited in this regard.

Figure 10:
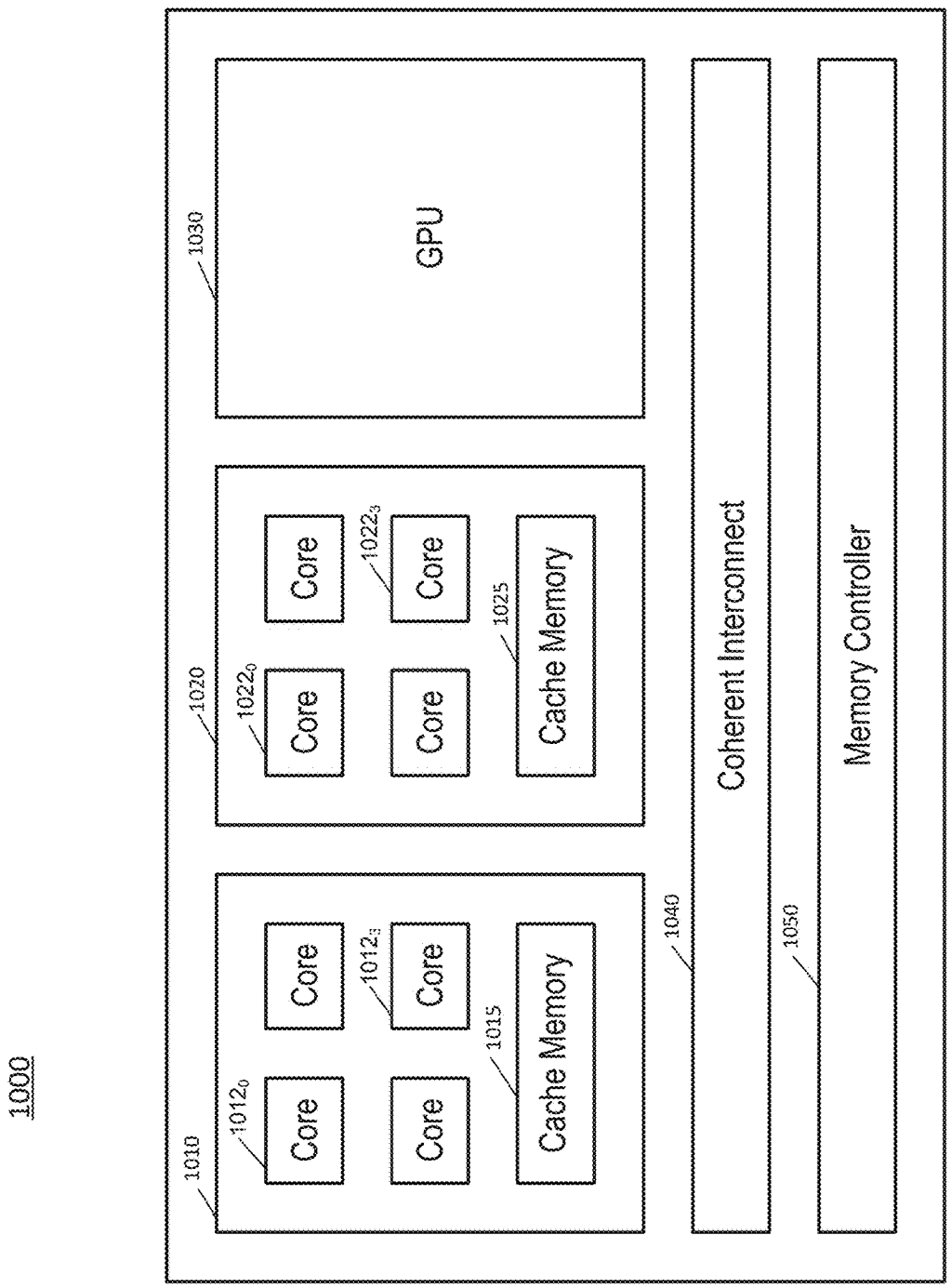
FIG. 10 is a block diagram of a representative SoC in accordance with an embodiment of the present invention.

Referring now to FIG. 10, shown is a block diagram of a representative SoC. In the embodiment shown, SoC 1000 may be a multi-core SoC configured for low power operation to be optimized for incorporation into a smartphone or other low power device such as a tablet computer or other portable computing device. As an example, SoC 1000 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 10, SoC 1000 includes a first core domain 1010 having a plurality of first cores $1012_0$-$1012_3$. In an example, these cores may be low power cores such as in-order cores. In one embodiment these first cores may be implemented as ARM Cortex A53 cores. In turn, these cores couple to a cache memory 1015 of core domain 1010. In addition, SoC 1000 includes a second core domain 1020. In the illustration of FIG. 10, second core domain 1020 has a plurality of second cores $1022_0$-$1022_3$. In an example, these cores may be higher power-consuming cores than first cores 1012. In an embodiment, the second cores may be out-of-order cores, which may be implemented as ARM Cortex A57 cores. In turn, these cores couple to a cache memory 1025 of core domain 1020. Note that while the example shown in FIG. 10 includes 4 cores in each domain, understand that more or fewer cores may be present in a given domain in other examples.

With further reference to FIG. 10, a graphics domain 1030 also is provided, which may include one or more graphics processing units (GPUs) configured to independently execute graphics workloads, e.g., provided by one or more cores of core domains 1010 and 1020. As an example, GPU domain 1030 may be used to provide display support for a variety of screen sizes, in addition to providing graphics and display rendering operations.

As seen, the various domains couple to a coherent interconnect 1040, which in an embodiment may be a cache coherent interconnect fabric that in turn couples to an integrated memory controller 1050. Coherent interconnect 1040 may include a shared cache memory, such as an L3 cache, in some examples. In an embodiment, memory controller 1050 may be a direct memory controller to provide for multiple channels of communication with an off-chip memory, such as multiple channels of a DRAM (not shown for ease of illustration in FIG. 10).

In different examples, the number of the core domains may vary. For example, for a low power SoC suitable for incorporation into a mobile computing device, a limited number of core domains such as shown in FIG. 10 may be present. Still further, in such low power SoCs, core domain 1020 including higher power cores may have fewer numbers of such cores. For example, in one implementation two cores 1022 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 11:
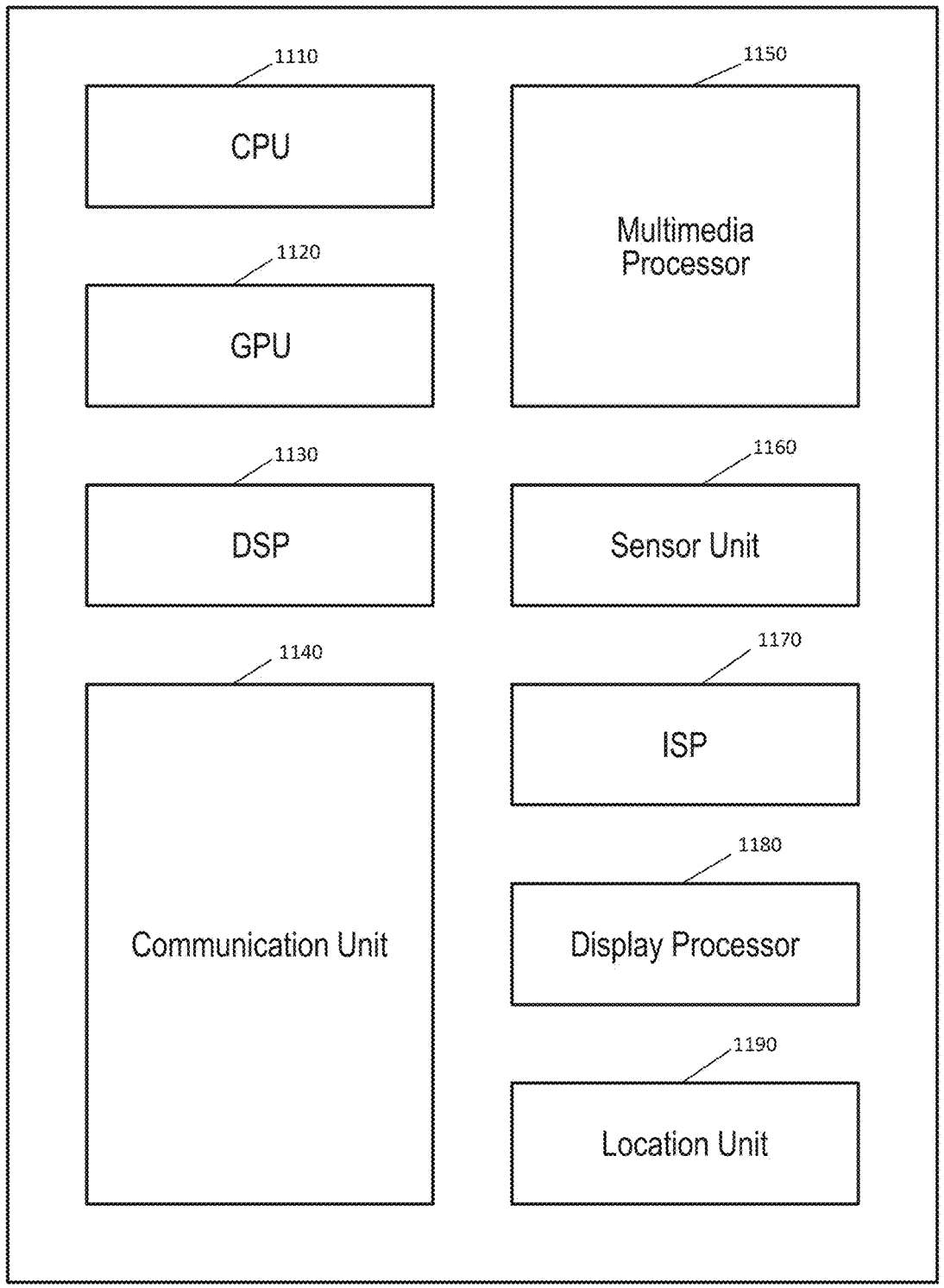
FIG. 11 is a block diagram of another example SoC in accordance with an embodiment of the present invention.

Referring now to FIG. 11, shown is a block diagram of another example SoC. In the embodiment of FIG. 11, SoC 1100 may include various circuitry to enable high performance for multimedia applications, communications and other functions. As such, SoC 1100 is suitable for incorporation into a wide variety of portable and other devices, such as smartphones, tablet computers, smart TVs and so forth. In the example shown, SoC 1100 includes a central processor unit (CPU) domain 1110. In an embodiment, a plurality of individual processor cores may be present in CPU domain 1110. As one example, CPU domain 1110 may be a quad core processor having 4 multithreaded cores. Such processors may be homogeneous or heterogeneous processors, e.g., a mix of low power and high power processor cores.

In turn, a GPU domain 1120 is provided to perform advanced graphics processing in one or more GPUs to handle graphics and compute APIs. A DSP unit 1130 may provide one or more low power DSPs for handling low-power multimedia applications such as music playback, audio/video and so forth, in addition to advanced calculations that may occur during execution of multimedia instructions. In turn, a communication unit 1140 may include various components to provide connectivity via various wireless protocols, such as cellular communications (including 3G/4G LTE), wireless local area protocols such as Bluetooth™, IEEE 802.11, and so forth.

Still further, a multimedia processor 1150 may be used to perform capture and playback of high definition video and audio content, including processing of user gestures. A sensor unit 1160 may include a plurality of sensors and/or a sensor controller to interface to various off-chip sensors present in a given platform. An image signal processor 1170 may be provided with one or more separate ISPs to perform image processing with regard to captured content from one or more cameras of a platform, including still and video cameras.

A display processor 1180 may provide support for connection to a high definition display of a given pixel density, including the ability to wirelessly communicate content for playback on such display. Still further, a location unit 1190 may include a GPS receiver with support for multiple GPS constellations to provide applications highly accurate positioning information obtained using as such GPS receiver. Understand that while shown with this particular set of components in the example of FIG. 11, many variations and alternatives are possible.

Figure 12:
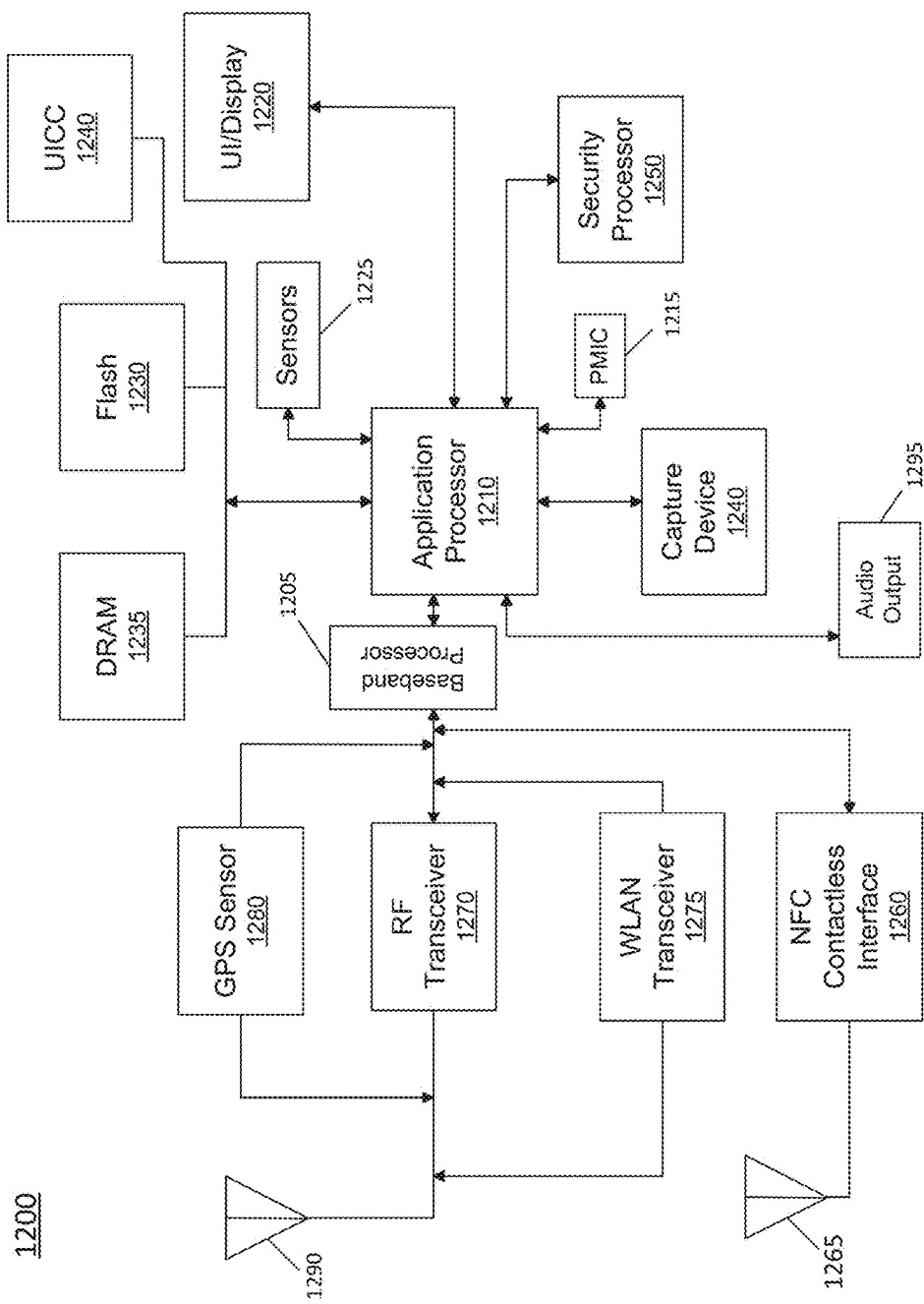
FIG. 12 is a block diagram of an example system with which embodiments can be used.

Referring now to FIG. 12, shown is a block diagram of an example system with which embodiments can be used. As seen, system 1200 may be a smartphone or other wireless communicator. A baseband processor 1205 is configured to perform various signal processing with regard to communication signals to be transmitted from or received by the system. In turn, baseband processor 1205 is coupled to an application processor 1210, which may be a main CPU of the system to execute an OS and other system software, in addition to user applications such as many well-known social media and multimedia apps. Application processor 1210 may further be configured to perform a variety of other computing operations for the device.

In turn, application processor 1210 can couple to a user interface/display 1220, e.g., a touch screen display. In addition, application processor 1210 may couple to a memory system including a non-volatile memory, namely a flash memory 1230 and a system memory, namely a dynamic random access memory (DRAM) 1235. As further seen, application processor 1210 further couples to a capture device 1240 such as one or more image capture devices that can record video and/or still images.

Still referring to FIG. 12, a universal integrated circuit card (UICC) 1240 comprising a subscriber identity module and possibly a secure storage and cryptoprocessor is also coupled to application processor 1210. System 1200 may further include a security processor 1250 that may couple to application processor 1210. A plurality of sensors 1225 may couple to application processor 1210 to enable input of a variety of sensed information such as accelerometer and other environmental information. Such information may be handled via an integrated sensor hub of application processor 1210, which may be associated with a memory to be dynamically power managed as described herein. An audio output device 1295 may provide an interface to output sound, e.g., in the form of voice communications, played or streaming audio data and so forth.

As further illustrated, a near field communication (NFC) contactless interface 1260 is provided that communicates in a NFC near field via an NFC antenna 1265. While separate antennae are shown in FIG. 12, understand that in some implementations one antenna or a different set of antennae may be provided to enable various wireless functionality.

A power management integrated circuit (PMIC) 1215 couples to application processor 1210 to perform platform level power management. To this end, PMIC 1215 may issue power management requests to application processor 1210 to enter certain low power states as desired. Furthermore, based on platform constraints, PMIC 1215 may also control the power level of other components of system 1200.

To enable communications to be transmitted and received, various circuitry may be coupled between baseband processor 1205 and an antenna 1290. Specifically, a radio frequency (RF) transceiver 1270 and a wireless local area network (WLAN) transceiver 1275 may be present. In general, RF transceiver 1270 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1280 may be present. Other wireless communications such as receipt or transmission of radio signals, e.g., AM/FM and other signals may also be provided. In addition, via WLAN transceiver 1275, local wireless communications can also be realized.

Figure 13:
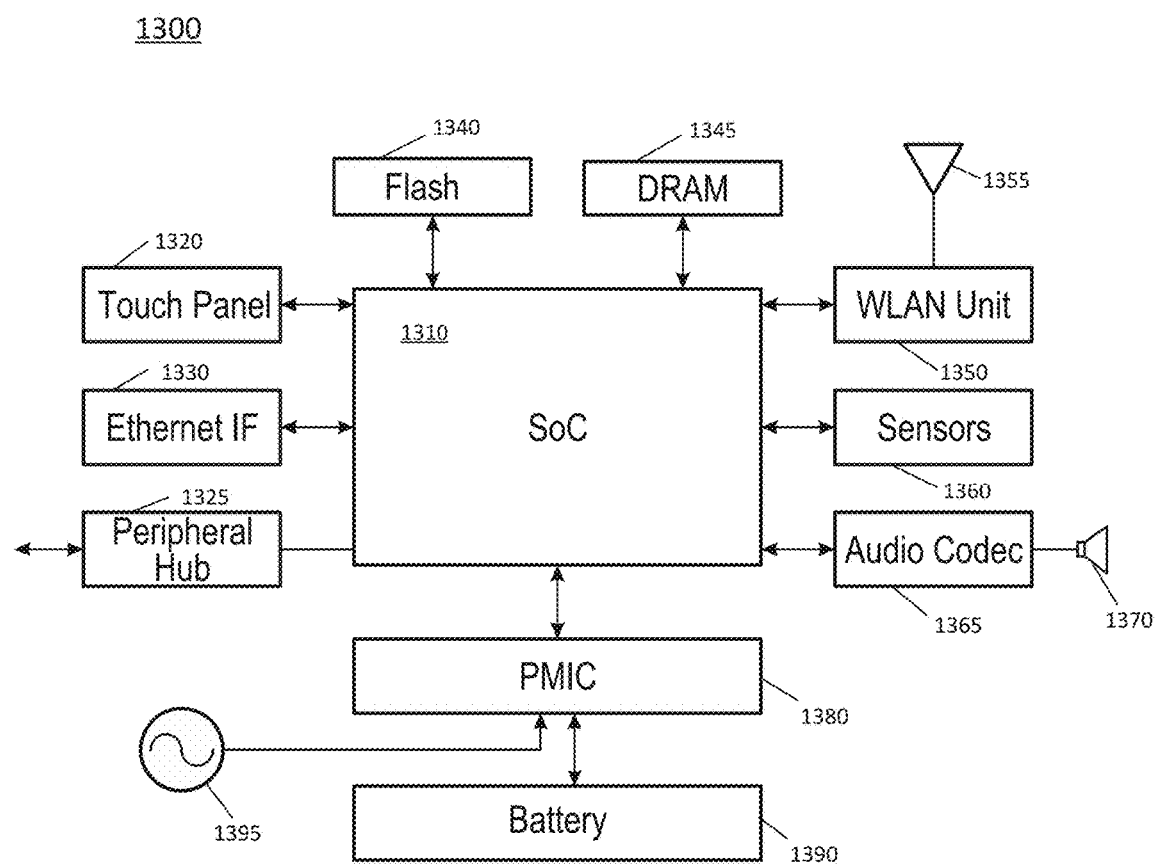
FIG. 13 is a block diagram of another example system with which embodiments may be used.

Referring now to FIG. 13, shown is a block diagram of another example system with which embodiments may be used. In the illustration of FIG. 13, system 1300 may be mobile low-power system such as a tablet computer, 2:1 tablet, phablet or other convertible or standalone tablet system. As illustrated, a SoC 1310 is present and may be configured to operate as an application processor for the device.

A variety of devices may couple to SoC 1310. In the illustration shown, a memory subsystem includes a flash memory 1340 and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 13, to provide for wireless capabilities, a WLAN unit 1350 is coupled to SoC 1310 and in turn to an antenna 1355. In various implementations, WLAN unit 1350 may provide for communication according to one or more wireless protocols.

As further illustrated, a plurality of sensors 1360 may couple to an integrated sensor hub of SoC 1310 (which in turn may be associated with a memory to be dynamically power managed as described herein). These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 13, many variations and alternatives are possible.

Figure 14:
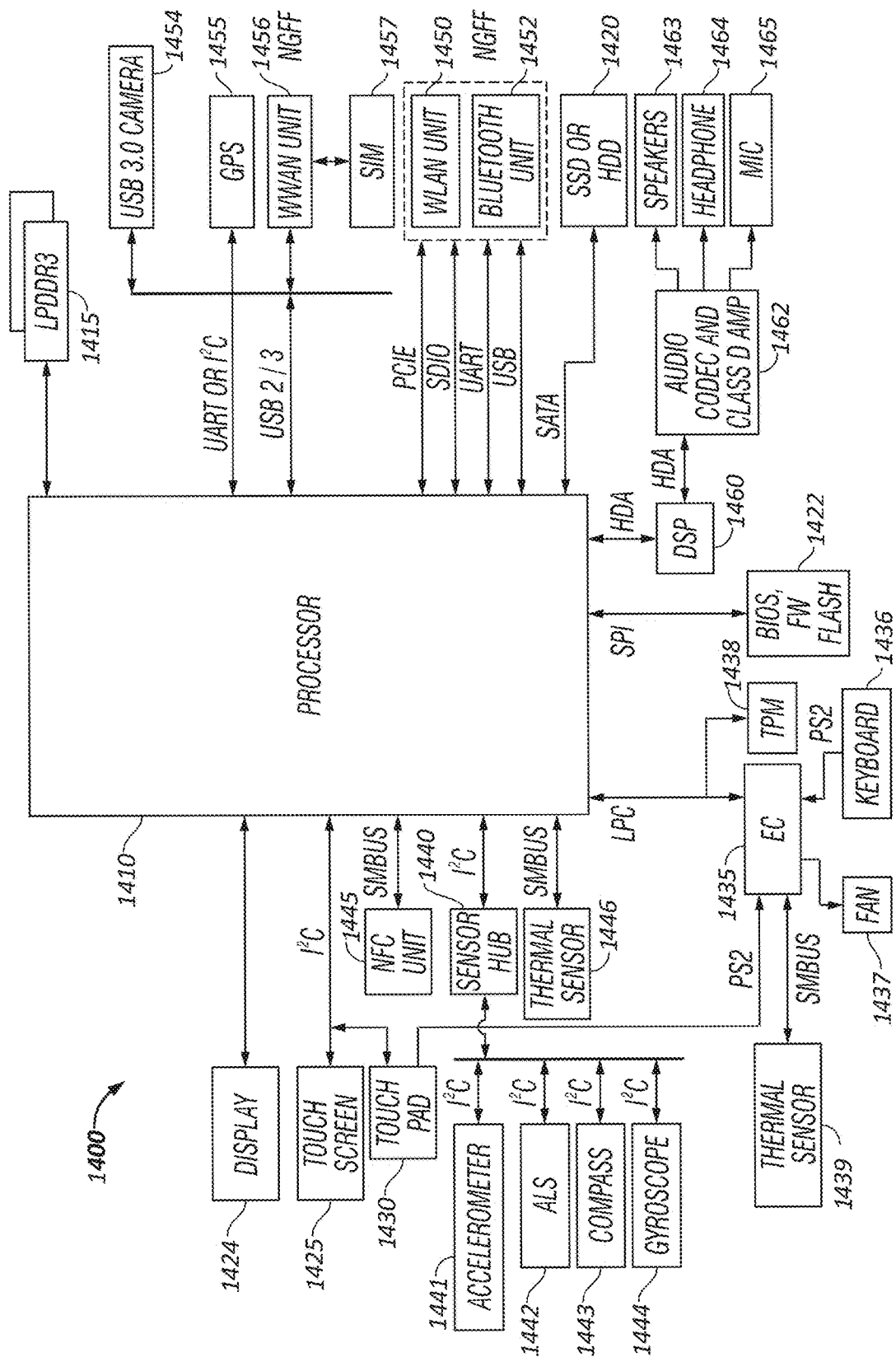
FIG. 14 is a block diagram of a representative computer system.

Referring now to FIG. 14, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 14, a flash device 1422 may be coupled to processor 1410, e.g., via a serial peripheral interface (SPI). This flash device may provide for non-volatile storage of system software, including a basic input/output software (BIOS) as well as other firmware of the system.

Various input/output (I/O) devices may be present within system 1400. Specifically shown in the embodiment of FIG. 14 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I²C interconnect. As further shown in FIG. 14, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 14, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 14, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 may also couple to processor 1410 via this LPC interconnect.

System 1400 can communicate with external devices in a variety of manners, including wirelessly. In the embodiment shown in FIG. 14, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 14, additional wireless units can include other short range wireless engines including a WLAN unit 1450 and a Bluetooth unit 1452. Using WLAN unit 1450, Wi-Fi™ communications can be realized, while via Bluetooth unit 1452, short range Bluetooth™ communications can occur. These units may communicate with processor 1410 via a given link.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 14, WWAN unit 1456 and an integrated capture device such as a camera module 1454 may communicate via a given link.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 14, understand the scope of the present invention is not limited in this regard.

Figure 15:
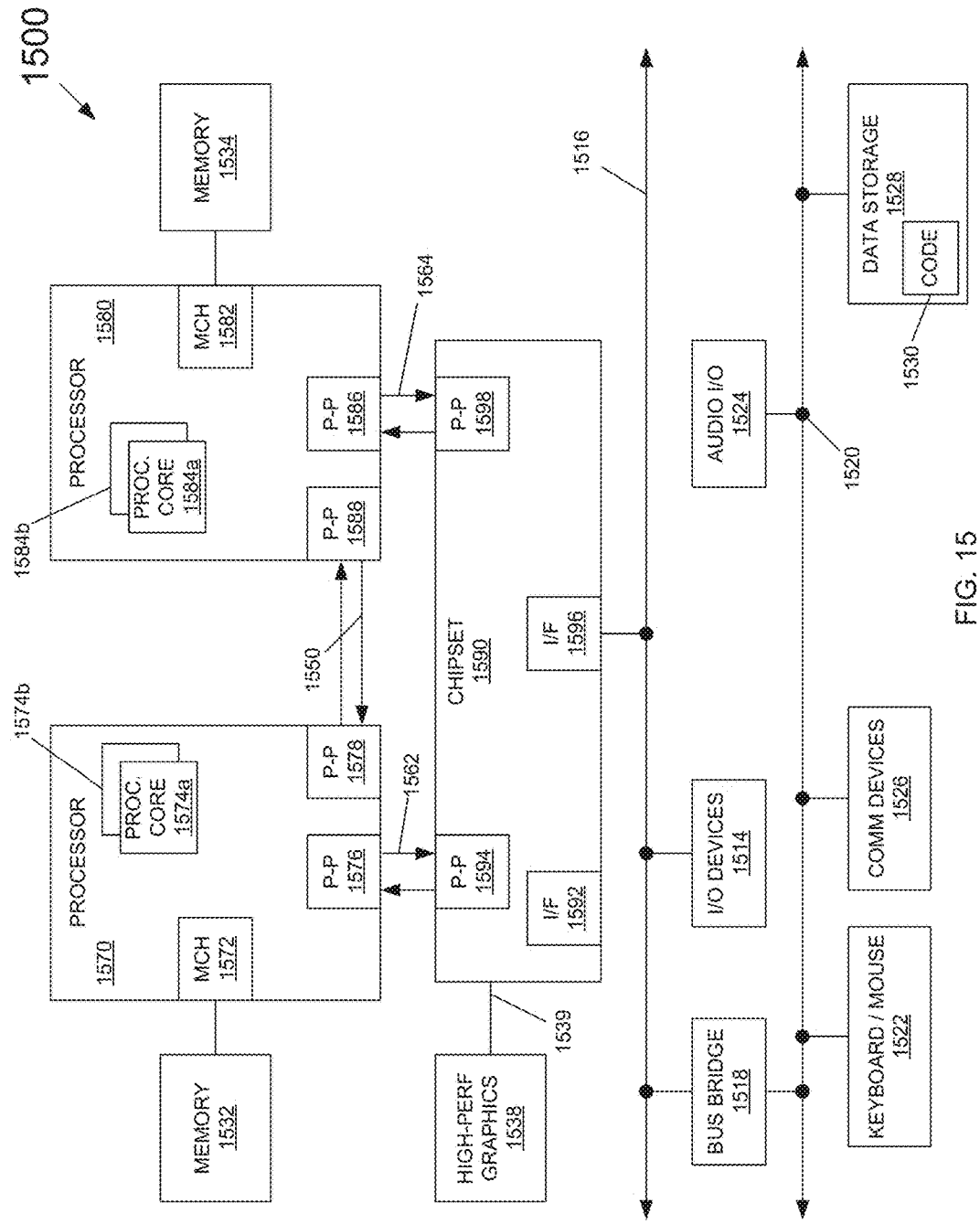
FIG. 15 is a block diagram of a system in accordance with an embodiment of the present invention.

Embodiments may be implemented in many different system types. Referring now to FIG. 15, shown is a block diagram of a system in accordance with an embodiment of the present invention. As shown in FIG. 15, multiprocessor system 1500 is a point-to-point interconnect system, and includes a first processor 1570 and a second processor 1580 coupled via a point-to-point interconnect 1550. As shown in FIG. 15, each of processors 1570 and 1580 may be multicore processors, including first and second processor cores (i.e., processor cores 1574a and 1574b and processor cores 1584a and 1584b), although potentially many more cores may be present in the processors. Each of the processors can include a PCU or other power management logic to perform processor-based power management as described herein.

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

In various embodiments, power management techniques are provided to reduce power consumption in a processor or other SoC including an integrated memory such as integrated into a sensor hub of the processor. In certain processors, this integrated sensor hub includes or is associated with an internal memory such as a SRAM. To reduce power consumption of this memory, certain portions may be powered off when not needed. For memory power management, reliance on a memory footprint sensitive firmware configuration that provides a priori information for each particular workload to be executed on the sensor hub can be difficult to obtain, an may not match realities of actual operation.

Instead, in embodiments described herein, an infrastructure for dynamic SRAM power management may be based on monitoring of actual SRAM usage. In this way, the memory can be controlled, e.g., by powering off of unused pages, without awareness of application layer firmware. Although the scope of the present invention is not limited in this regard, a paging memory architecture of a processor, e.g., a memory management unit (MMU), may be used to track access information of the SRAM pages and based on such information determine an appropriate amount of the memory to maintain powered on.

In general, when a page usage count stays at least at a predetermined low level (e.g., a zero count) for a predetermined time period (e.g., 4 seconds), the corresponding page may be saved to a backup storage, marked as non-present in a page table entry for the page and powered down. Thereafter, a next access to this page results in a page fault, which in turn may cause the page to be powered on and data re-filled from the backup storage. Note that this shutdown and power on of the memory page may be transparent or invisible to application code and does not use any special power savings-aware code of an application.

Embodiments thus enable dynamic power control without a firmware configuration provided for specific use cases and transitioning to such special use case state in order to reduce SRAM power consumption. As such, embodiments enable dynamic adjustment of SRAM size during execution of any application, process or other code, rather than limiting power saving opportunities to a limited subset of pre-defined use cases specially optimized in advance. Thus a size of powered portion of an internal memory may be dynamically adjusted based on memory demands of a currently active working set, e.g., as determined with reference to statistical analyses of page manager operations such as usage statistics maintained per memory page.

Figure 16:
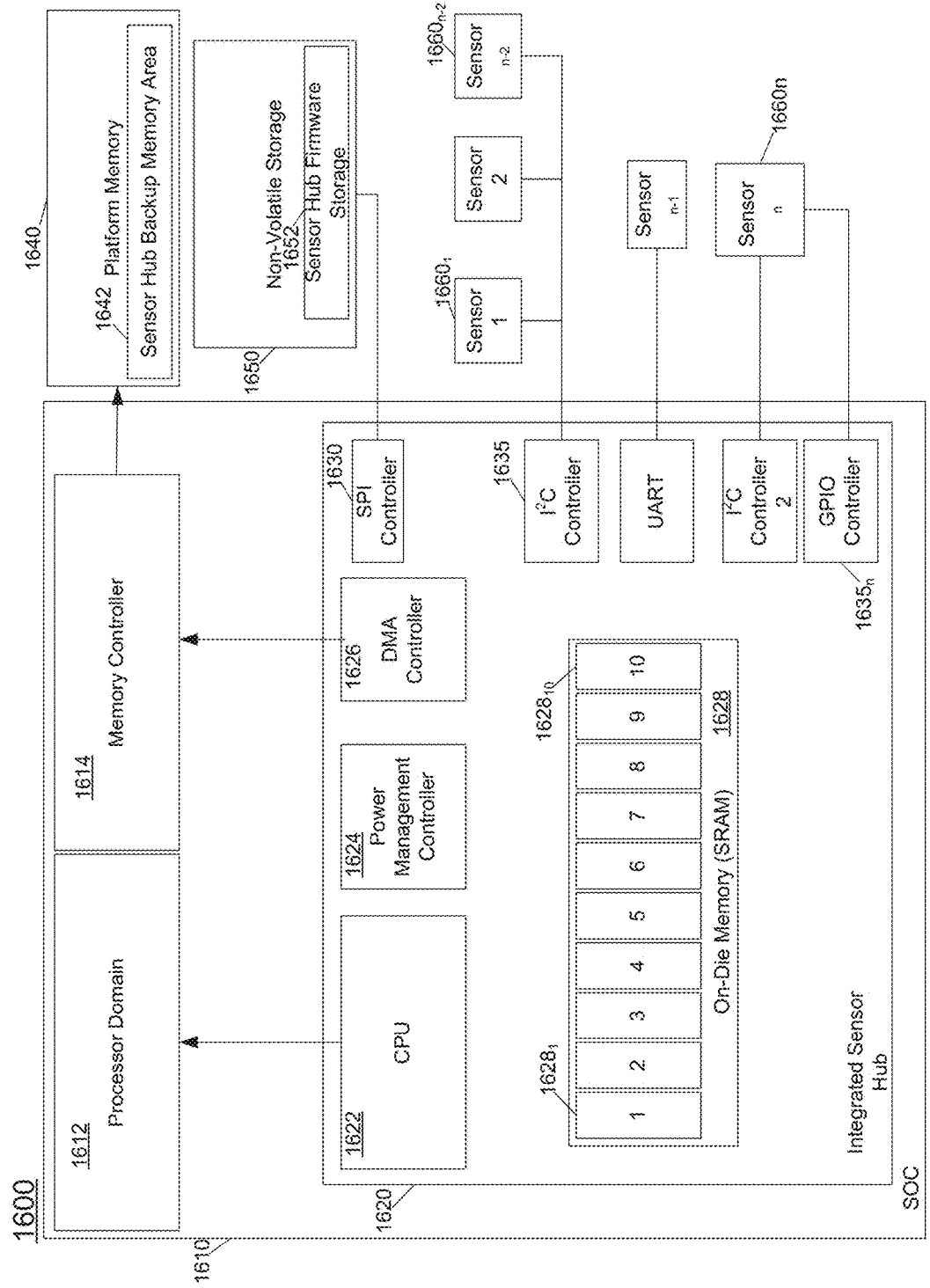
FIG. 16 is a block diagram of a system in accordance with an embodiment of the present invention.

Referring now to FIG. 16, shown is a block diagram of a system 1600 in accordance with an embodiment, which may be a portable computing device such as a smartphone, tablet computer or so forth. As seen, system 1600 includes an SoC 1610 formed of a single semiconductor die. In the embodiment shown, SoC 1610 includes a processor domain 1612, which may include a plurality of processor cores, each of which may be in its own independent domain (e.g., for purposes of independent voltage and frequency control). Still further, processor domain 1612 also may include one or more independent graphics engines such as independent graphics processing units to independently perform graphics operations. In addition, SoC 1610 includes a memory controller 1614 to act as interface to a system or platform memory 1640, which in an embodiment may be implemented as a DRAM (e.g., a DDR DRAM).

Still in reference to FIG. 16, SoC 1610 includes an integrated sensor hub (ISH) 1620, which may act as a control and interface mechanism with various platform sensors. As seen, a plurality of sensors $1660_1$-$1660_n$ couple to SoC 1610, and more specifically to one or more controllers of ISH 1620. Specifically, sensors 1660 may couple to a corresponding one or more of sensor controllers $1635_0$-$1635_n$.

In the embodiment shown, ISH 1620 further includes an internal on-die memory 1628, which in an embodiment may be SRAM. As seen, memory 1628 is configured as a partitioned or multi-bank memory including a plurality of banks $1628_1$-$1628_{10}$.

To enable power management as described herein by dynamically controlling the number of such banks to be powered on, interactions may occur between a CPU 1622 of ISH 1620, a power management controller 1624, as well as via interfaces to processor domain 1612 and memory controller 1614.

With regard to dynamic memory power management of SRAM 1628, a paging memory architecture may be used, including a memory management unit (MMU) of processor domain 1612. In general, MMU of processor domain 1612 includes various paging structures including one or more translation lookaside buffers (TLBs), and management logic. In addition, when one or more banks of SRAM 1628 are to be placed into a particular low power state, the information stored therein may be paged to a backup memory area, which in the embodiment shown is a memory area 1642 included within platform memory 1640. As such, these paging interactions may occur further using a direct memory access (DMA) controller 1626 and memory controller 1614.

Still with reference to FIG. 16, a non-volatile storage 1650 couples to SoC 1610, and more specifically to a serial peripheral interface (SPI) controller 1630. In an embodiment, non-volatile storage 1650 is implemented as a flash memory. As seen, non-volatile storage 1650 further includes a firmware storage 1652, which may store a firmware image for ISH 1620. At least portions of the image may be stored within SRAM 1628 via SPI controller 1630 for more ready access. Understand while shown at this high level in the embodiment of FIG. 16, many variations and alternatives are possible.

Figure 17:
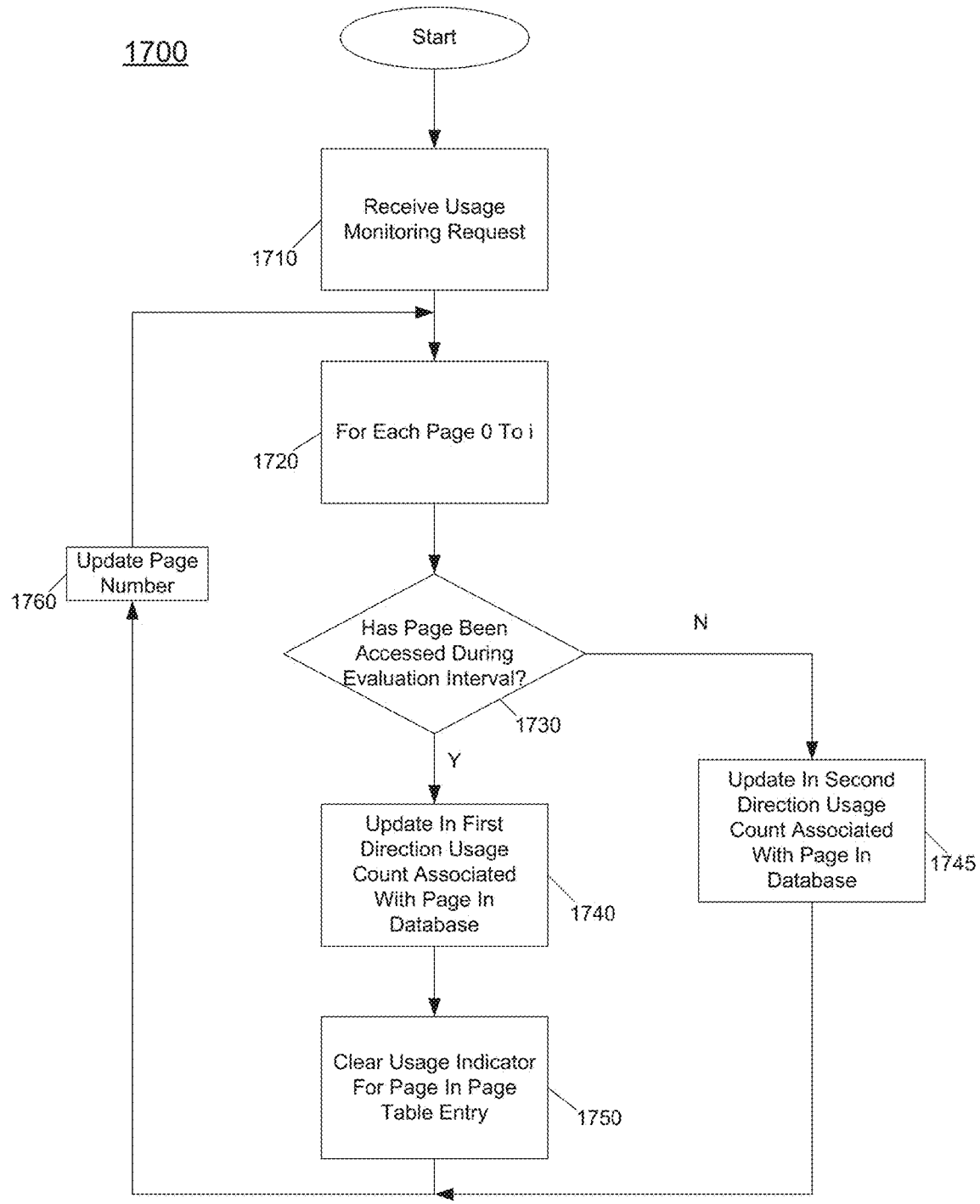
FIG. 17 is a flow diagram of a method in accordance with an embodiment of the present invention.

Referring now to FIG. 17, shown is a flow diagram of a method in accordance with an embodiment of the present invention. More specifically, method 1700 shown in FIG. 17 may be performed by various combinations of hardware, software, and/or firmware to perform analysis of on-die memory usage, namely an SRAM included in or associated with an ISH. In one embodiment, method 1700 may be initiated responsive to a request from a power management controller such as a PCU of the processor. Further, understand that some or all of method 1700 may be performed by a paging manager of a MMU (also referred to herein as a page manager), e.g., included in a processor or core domain of the processor. As seen, method 1700 begins by receiving a usage monitoring request (block 1710). In this particular embodiment, the request may be received from the PCU within the paging manager. In one embodiment, such request may be issued on a periodic basis, e.g., between approximately every 0.1 to 0.5 seconds.

Still in reference to FIG. 17, a loop is performed for each memory page of the SRAM (pages zero to i) beginning at block 1720. As seen, it can be determined whether the given page has been accessed during the evaluation interval at diamond 1730 (e.g., since a last request by the PCU (or more specifically, since the completion of the last report by the paging manager to the PCU)). As described further below, in one embodiment, this determination may be made with reference to information in a page table of the MMU, namely a usage indicator set when the page is accessed. If such access has occurred, control passes to block 1740 where a usage count associated with the page may be updated in a first direction (e.g., increment). Note this usage count may be stored in a database accessible to the page manager, such as a SRAM page database, which may be stored in an always powered portion of a SRAM, in an embodiment. From block 1740, control passes to block 1750 where a usage indicator for the page may be cleared in the corresponding page table entry. Otherwise, if the page was not accessed during the last evaluation interval, control passes to block 1745 where the usage count may be updated in a second direction (e.g., decrement).

Still with reference to FIG. 17, from both blocks 1745 and 1750, control passes to block 1760 where the page number for the page to next be analyzed is updated. Thus method 1700 is performed for each page within the SRAM. At a conclusion of this analysis, understand that the page manager may send compiled information (e.g., regarding usage statistics) to the PCU. In other cases, the page manager may utilize such information in further power management operations as described herein.

Figure 18:
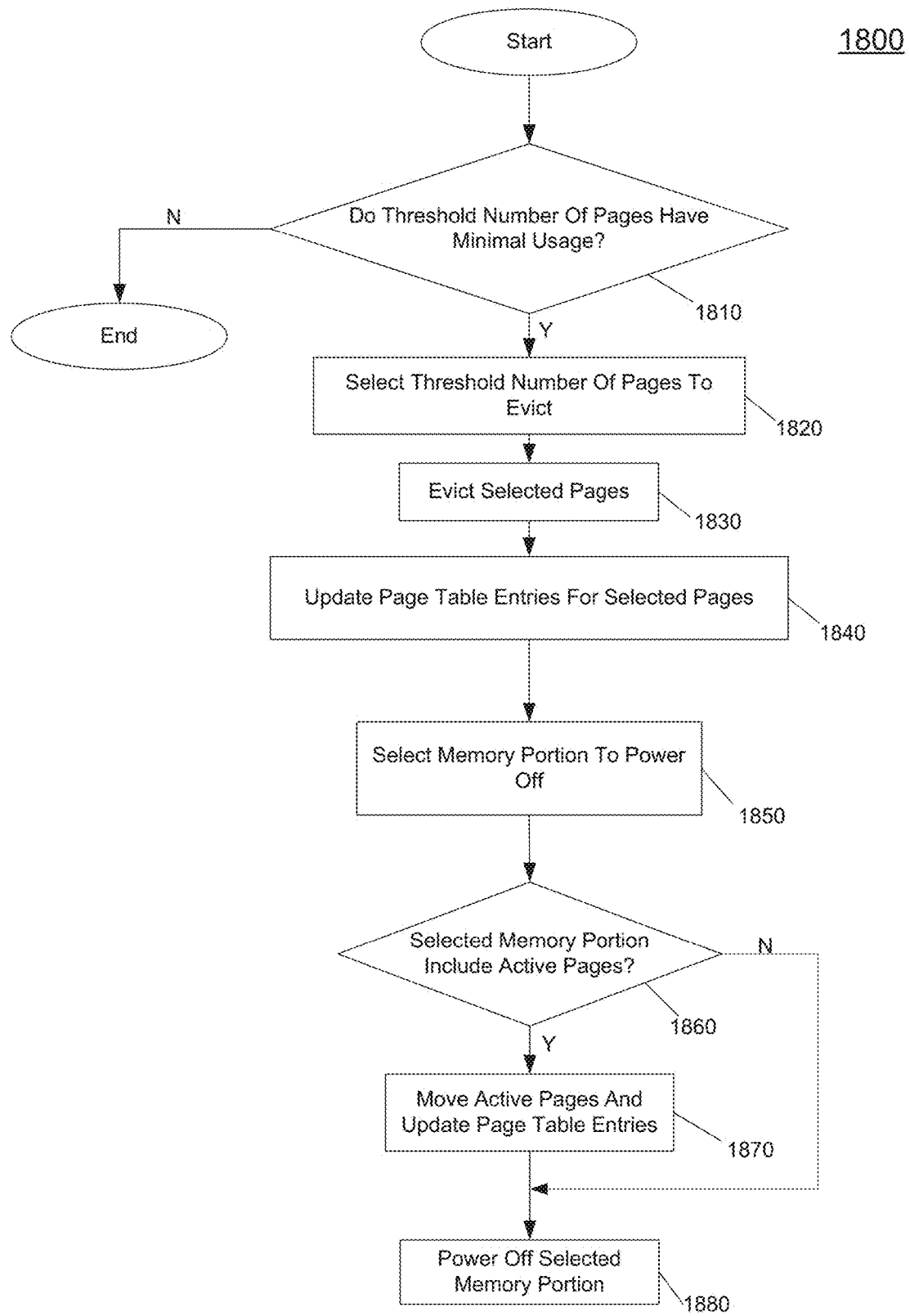
FIG. 18 is a further method in accordance with an embodiment of the present invention.

Referring now to FIG. 18, shown is a further method in accordance with an embodiment. More specifically, method 1800 shown in FIG. 18 may be performed by various combinations of hardware, software, and/or firmware. As shown in FIG. 18, method 1800 may be used to dynamically determine and select one or more portions of an on-die memory to power off to reduce power consumption. As seen, method 1800 begins by determining whether a threshold number of pages have a minimal usage (diamond 1810). Although the scope of the present invention is not limited in this regard, in one embodiment the determination of minimal usage may correspond to a zero level usage count for the corresponding page (e.g., over the last evaluation interval). In other cases, a relatively small number of page usages (e.g., one or two) may correspond to the minimal usage level. As to the threshold number of pages, while the scope of the present invention is not limited in this regard, in an embodiment of a multi-bank memory where each bank includes 8 pages, this threshold number may be 8. If it is determined that the number of pages having minimal usage is not at least at this threshold level, method 1800 may conclude for the current evaluation interval.

Still with reference to FIG. 18, if instead at least the threshold number of pages has minimal usage, control passes to block 1820 where the threshold number of pages may be selected for eviction. Next at block 1830 the selected pages may be evicted. Next control passes to block 1840, where the page table entries for the selected pages may be updated. As one example, a not present indicator may be set for each of these pages in the corresponding page table entries. Next control passes to block 1850, where a memory portion to be powered off may be selected. As an example, this selection process may be based on the active memory portion having the greatest number of inactive pages. Control then passes to diamond 1860 where it can be determined whether the selected memory portion includes active pages. If so, control passes to block 1870 where the active pages may be moved to other portions of the memory that are to remain active. Still further the corresponding page table entries may be updated for these active pages to indicate their new location. Finally, control passes to block 1880 where the selected memory portion may be powered off. While shown at this high level in the embodiment of FIG. 18, many variations and alternatives are possible.

Figure 19:
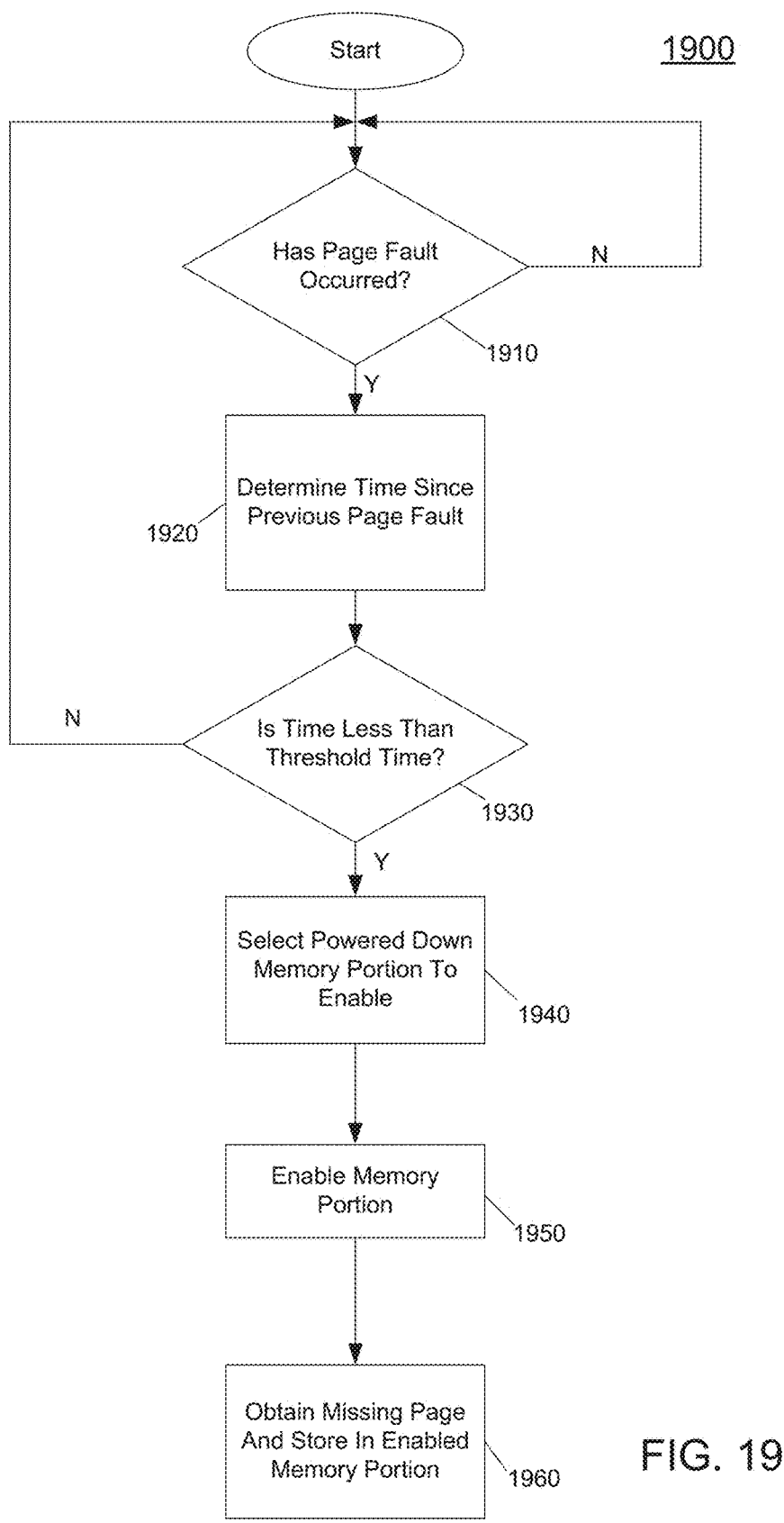
FIG. 19 is a flow diagram of a method for powering up a powered off memory portion in accordance with an embodiment.

Referring now to FIG. 19, shown is a flow diagram of a method for powering up a powered off memory portion in accordance with an embodiment. More specifically, method 1900 shown in FIG. 19 may be performed by various combinations of hardware, software, and/or firmware. As seen, method 1900 begins by determining whether a page fault has occurred (diamond 1910). Such page fault occurs when a requested memory page is not present in an on-die memory and thus triggers a page fault to bring the page in from another portion of a memory hierarchy (e.g., a platform memory). If such page fault has occurred, control passes to block 1920 to determine the time since the previous page fault. Such determination may be made with reference to a value stored in a storage that stores a timestamp of the time of the last page fault. If it is determined that this time is less than a threshold time (as determined at diamond 1930), control passes to block 1940 where a powered down portion of the memory may be selected to be enabled. In an embodiment, this threshold may be approximately 1 second. Note that in some embodiments, the threshold depends on the power characteristics of the system: here, a page fault may immediately lead to enabling extra memory area, as the power penalty of the page fault exceeds the power savings introduced by powering down the memory portion. After such selection, the selected memory portion may be enabled (block 1950). Thereafter, control passes to block 1960 where the missing page is obtained from the memory hierarchy and stored in this enabled memory portion, where it can thereafter be accessed as requested. Although shown at this high level in the embodiment of FIG. 19, many variations and alternatives are possible.

Figure 20:
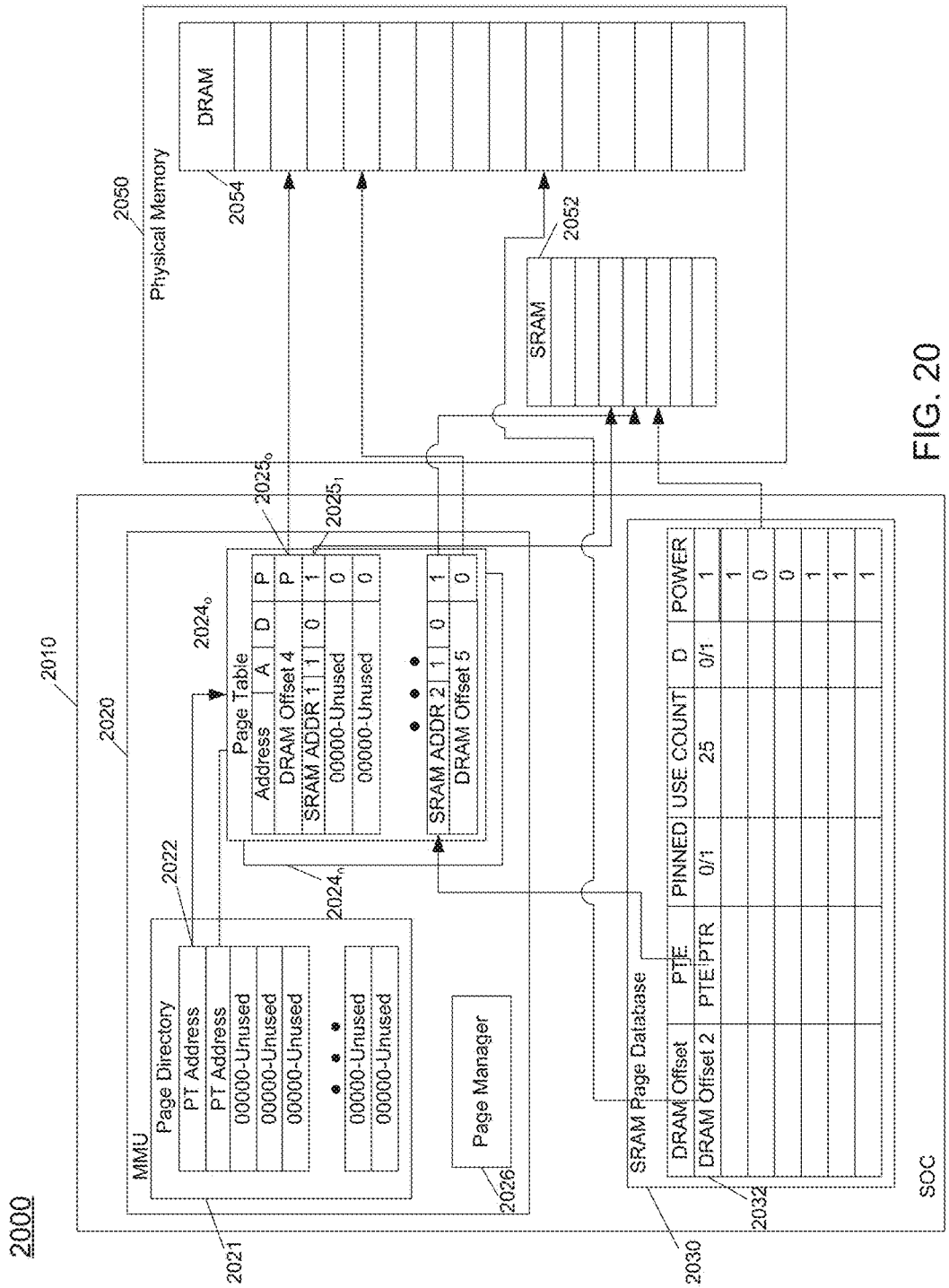
FIG. 20 is a block diagram of a platform in accordance with an embodiment of the present invention.

Referring now to FIG. 20, shown is a block diagram of a portion of a platform 2000 in accordance with an embodiment of the present invention. In the high level shown in FIG. 20, platform 2000 includes a processor 2010 (e.g., a given SoC) that is coupled to a physical memory 2050. Note that in the implementation shown, physical memory 2050 includes disparate memories, including a SRAM 2052 (which in actuality may be included within SoC 2010) and a DRAM 2054, which in an embodiment is a platform memory for the platform. Thus while shown as a unitary structure in FIG. 20, understand that physical memory 2050 may be formed of constituent portions of a memory hierarchy which may be physically located in disparate portions of a platform. Understand still further that additional portions of a memory hierarchy such as a mass storage device, e.g., implemented as a non-volatile memory, a disk drive or so forth, may further be present but are not shown for ease of illustration in FIG. 20.

To perform the power management operations described herein, a processor 2010 includes a MMU 2020 with paging structures including a page directory 2021 having a plurality of entries 2022 and a plurality of page tables $2024_0$-$2024_n$, all of which may be accessible to a page manager 2026 of the MMU. Addresses stored within the page table entries may be used to access corresponding entries within pages of physical memory 2050. As seen for example, page table $2024_0$ includes entries $2025_0$ and $2025_1$. Each entry 2025 includes an address portion, which may be an address offset to a location in DRAM 2054 or an address within SRAM 2052. In addition, various metadata is present in each entry 2025, including an access indicator, a dirty indicator, and a presence indicator.

For purposes of the memory-based power management described herein, page manager 2026 of MMU 2020 may further interface to a SRAM page database 2030, including a plurality of entries 2032 each associated with a given page within SRAM 2052. In an embodiment, database 2030 may be maintained in an always powered portion of SRAM 2052. As seen, various information may be included in each entry, such as: an address portion; a page table entry portion to point to a corresponding entry in a page table; a pinned indicator to indicate that data or code located in a specific page includes critical information to be located in SRAM and the corresponding page is not to be shut down, even if its usage count reaches zero; a usage field to store a count usages (e.g., a number of accesses to the corresponding page within an evaluation interval); a dirty indicator to indicate whether a page within the SRAM includes updated information; and a power status indicator to indicate whether the given page is powered on.

As described herein, page manager 2026 may use various information present in a page table entry 2025 and an entry 2032 of SRAM page database 2030 to determine usage characteristics of pages, in determination of one or more portions of the memory to power down (and additionally to power back up). Note that in an embodiment, the usage count stored in a corresponding entry of database 2030 may be assigned a predetermined initial usage count value (e.g., 64, in an embodiment) when the page is brought in to SRAM 2052 from memory 2054 as a result of a page fault. Also understand the footprint of database 2030 may be small as it maintains statistics only for the pages currently located in the SRAM, and not for all ISH code and data pages.

Thus rather than using the use count field to identify a potential eviction victim when a page fault occurs and the memory is fully occupied, embodiments may use this information to identify potential shutdown victims.

Note that page manager 2026 may be periodically invoked, e.g., by a power controller of the processor to scan database 2030. For each page present in memory 2052, page manager 2026 checks and clears an accessed indicator or bit (A bit) in the corresponding PTE of a page table 2024. If the page was accessed since the previous "check and clear" cycle, the A bit is set by MMU 2020 and page manager 2026 updates the usage count for this page in database 2030 (e.g., increment). If the A bit is not set the usage count is updated in the opposite direction (e.g., decrement).

When a scan is completed, page manager 2026 determines whether at least a predetermined number of pages reached a threshold minimum usage count (e.g., 8 pages with a zero usage count). If the threshold number of pages remains with this threshold minimum usage count for longer than a predefined idle time, a shutdown procedure is performed.

As described above, in general this shutdown procedure includes, for each data page selected for eviction, an eviction flow (e.g., check a dirty bit of the page to identify whether its contents are to be copied to a platform memory), corresponding cache is flushed and page is copied to the platform memory. In addition, the corresponding PTE entry is updated to mark the page as non-present. Next, one of the memory portions (e.g., banks) is selected for shutdown (e.g. a bank containing the largest number of victim pages). If the selected bank contains pages with non-zero usage count, the contents of these pages are migrated or copied into locations of evicted pages in other banks remaining powered on, and corresponding PTE entries are updated to point to the new location of the moved page. When all such pages are moved from the selected bank, the bank is shutdown.

Also as described above, the reverse procedure may be performed when the shrinked memory size leads to frequent page faults due to smaller than working set area. In an embodiment, each time a page fault occurs, page manager 2026 checks a time passed since the previous page fault. If this time is shorter than a predefined time interval (e.g., T-Inter-Pagefault-Min stored in a configuration register), page faults occur on a too-frequent basis and another portion of the memory may be enabled. In this case, instead of evicting one of the memory pages, a new portion (e.g., bank) is powered on and contents of the missing page are brought into the newly powered memory location. While shown with this particular implementation in FIG. 20, understand the scope of the present invention is not limited to this implementation and variations and alternatives are possible.

Figure 21:
FIG. 21 is an illustration of memory power status before and after analysis in accordance with an embodiment of the present invention.

Referring now to FIG. 21, shown is a block diagram of an on-die memory as described herein. As seen, a SRAM 2100 is shown prior to analysis using a power management technique as described herein (and after, at SRAM 2100'). SRAM 2100 includes four illustrated banks $2100_0$-$2100_3$, all powered on, where black blocks correspond to pages having non-zero access counts and blank blocks correspond to pages having zero access counts. After performing an analysis as described herein, power may be conserved by selecting one or more banks (multiple banks in this example) to be powered down, and evicting unused or minimally used data stored therein (e.g., to a memory hierarchy). Further, by migrating any active pages within the banks selected to be powered down (namely banks $2100_1$ and $2100_3$ shown as shaded blocks), these two banks may be powered down and the active data store therein is migrated to one of powered on banks $2100_0$ and $2100_2$. Understand while shown with this limited number of banks and pages per bank, embodiments may be applied to a wide variety of memory architectures.

The following examples pertain to further embodiments.

In one example, a processor comprises: at least one core to execute instructions; a memory coupled to the at least one core, the memory including a plurality of pages to store information; and a page manager coupled to the memory to access metadata of a page table entry associated with a page of the memory and update usage information of an entry of a database, the entry of the database associated with the page of the memory, where the page manager is to cause at least a portion of the memory to be dynamically powered down based at least in part on the usage information.

In an example, the processor comprises an integrated sensor hub to interface with a plurality of sensors coupled to the processor, the integrated sensor hub including the memory.

In an example, the memory comprises a plurality of banks, the page manager to cause a first bank including the page to be powered down when at least a threshold number of pages of the memory have corresponding usage counts less than a usage threshold.

In an example, the page manager is to cause the first bank to be powered down further when at least the threshold number of pages of the memory has the corresponding usage counts less than the usage threshold for a threshold idle duration.

In an example, the page manager is to select the first bank to power down based at least in part on corresponding usage counts of a first plurality of pages of the first bank.

In an example, the page manager, prior to power down of the first bank, is to: evict a first page of the first plurality of pages to a backup storage area of a platform memory coupled to the processor; and move a second page of the first plurality of pages to a second bank of the memory.

In an example, the page manager is to evict the first page and move the second page when a usage count of the second page is greater than a usage count of the first page.

In an example, the page manager, responsive to a page fault that results from a memory access request that misses in the memory, is to determine whether a time since a prior page fault is less than a threshold time, and if so, to enable the first bank, and otherwise to maintain the first bank powered down.

In an example, the page manager is to thereafter load a page associated with the memory access request from a platform memory coupled to the processor to the first bank.

In an example, the page manager is to determine, based on metadata of a plurality of page table entries, each of the plurality of page table entries associated with a page of the memory, whether the corresponding page of the memory has been accessed during an evaluation interval and if so, update a usage count of a corresponding entry of the database in a first direction, and otherwise update the usage count of the corresponding entry of the database in a second direction.

In an example, the page manager is to cause at least the portion of the memory to be dynamically powered down based on usage information associated with at least the portion of the memory, without workload configuration information for a workload to be executed on the processor.

Note that the above processor can be implemented using various means.

In an example, the processor comprises a SoC incorporated in a user equipment touch-enabled device.

In another example, a system comprises a display and a memory, and includes the processor of one or more of the above examples.

In another example, a method comprises: determining, via a memory management unit of a processor, whether a threshold number of pages of an internal memory of the processor have been accessed less than a threshold number of times during an evaluation interval; and if so, dynamically reducing a size of an active portion of the internal memory.

In an example, the method further comprises dynamically reducing the size of the active portion of the internal memory without information regarding workload characteristics of a workload executed on the processor.

In an example, the method further comprises: maintaining, via a paging manager of the memory management unit of the processor, usage information regarding the pages of the internal memory; and determining, based on the usage information, whether the threshold number of pages have been accessed less than the threshold number of times during the evaluation interval.

In an example, the method further comprises: migrating one or more pages from a first portion of the internal memory to be powered down to a second portion of the internal memory to remain powered on; sending one or more other pages from the first portion of the internal memory to be powered down to a platform memory coupled to the processor; updating page table entries associated with the one or more pages to indicate the migrating and updating page table entries associated with the one or more other pages to indicate the sending; and powering down the first portion of the internal memory.

In another example, a computer readable medium including instructions is to perform the method of any of the above examples.

In another example, an apparatus comprises means for performing the method of any one of the above examples.

In a still further example, a system comprises: a processor having: a first domain including a plurality of cores each to independently execute instructions; a second domain including at least one graphics engine to independently perform graphics operations; a sensor hub coupled to the first domain and to interface with at least one sensor to couple to the processor; a memory associated with the sensor hub and having a plurality of portions; a memory management unit including a page manager to access page table information and to update a database associated with the memory based on the page table information; and a power controller including a first logic to dynamically power down at least one of the plurality of portions of the memory based at least in part on usage information stored in the database regarding the at least one of the plurality of portions of the memory. In turn, the system further comprises a platform memory coupled to the processor, the platform memory separate from the memory.

In an example, the sensor hub comprises an integrated sensor hub, the integrated sensor hub including the memory.

In an example, the first logic is to dynamically reduce a size of an active portion of the memory without reference to workload information regarding the sensor hub.

In an example, the memory management unit is included in the first domain of the processor, the first domain separate from the sensor hub, and where the database is to be stored in a portion of the memory.

In an example, the page manager is to access a page table address stored in an entry of a page directory, the page table address used to access a page table including a plurality of page table entries, where the page manager is to access the page table information from a first entry of the plurality of page table entries and to update a use count of an entry of the database associated with a page of the memory associated with the first entry of the plurality of page table entries.

Understand that various combinations of the above examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
   at least one core to execute instructions;
   a memory coupled to the at least one core, the memory to include a plurality of pages to store information;
   an integrated sensor hub to interface with a plurality of sensors coupled to the processor, the integrated sensor hub including the memory; and
   a page manager coupled to the memory, the page manager to access metadata of a page table entry associated with a page of the memory and update usage information of an entry of a database based at least in part on access information of the metadata, the entry of the database associated with the page of the memory, wherein the page manager is to cause at least a portion of the memory to be dynamically powered off based at least in part on the usage information, wherein the memory comprises a plurality of banks, the page manager to cause a first bank including the page to be powered off when at least a threshold number of pages of the memory have corresponding usage counts less than a usage threshold, and responsive to a page fault that results from a memory access request that misses in the memory, to determine whether a time since a prior page fault is less than a threshold time, and if so, to enable the first bank, and otherwise to maintain the first bank powered off.

2. The processor of claim 1, wherein the page manager is to cause the first bank to be powered off further when at least the threshold number of pages of the memory has the corresponding usage counts less than the usage threshold for a threshold idle duration.

3. The processor of claim 1, wherein the page manager is to select the first bank to power off based at least in part on corresponding usage counts of a first plurality of pages of the first bank.

4. The processor of claim 3, wherein the page manager, prior to power off of the first bank, is to:
   evict a first page of the first plurality of pages to a backup storage area of a platform memory coupled to the processor; and
   move a second page of the first plurality of pages to a second bank of the memory.

5. The processor of claim 4, wherein the page manager is to evict the first page and move the second page when a usage count of the second page is greater than a usage count of the first page.

6. The processor of claim 1, wherein the page manager is to thereafter load a page associated with the memory access request from a platform memory coupled to the processor to the first bank.

7. The processor of claim 1, wherein the page manager is to determine, based on access information of a plurality of page table entries, each of the plurality of page table entries associated with a page of the memory, whether the corresponding page of the memory has been accessed during an evaluation interval and if so, update a usage count of a corresponding entry of the database in a first direction, and otherwise update the usage count of the corresponding entry of the database in a second direction.

8. The processor of claim 1, wherein the page manager is to cause at least the portion of the memory to be dynamically powered off based on usage information associated with at least the portion of the memory, without workload configuration information for a workload to be executed on the processor.

9. A non-transitory machine-readable medium having stored thereon instructions, which if performed by a machine cause the machine to perform a method comprising:
   maintaining, via a paging manager of a memory management unit of a processor, usage count information regarding pages of an internal memory of the processor associated with a sensor hub of the processor, including updating the usage count information for a page of the internal memory based on whether the page was accessed during a first evaluation interval;
   determining, via the memory management unit of the processor based on the usage count information, whether a threshold number of pages of the internal memory have been accessed less than a threshold number of times during a second evaluation interval;
   if so, dynamically reducing a size of an active portion of the internal memory; and
   responsive to a page fault that results from a memory access request that misses in the internal memory, determining whether a time since a prior page fault is less than a threshold time, and if so, increasing the size of the active portion of the internal memory, and if not, maintaining the reduced size of the active portion of the internal memory.

10. The non-transitory machine-readable medium of claim 9, wherein the method further comprises dynamically reducing the size of the active portion of the internal memory without information regarding workload characteristics of a workload executed on the processor.

11. The non-transitory machine-readable medium of claim 9, wherein the method further comprises:
   migrating one or more pages from a first portion of the internal memory to be powered off to a second portion of the internal memory to remain powered on;
   sending one or more other pages from the first portion of the internal memory to be powered off to a platform memory coupled to the processor;
   updating page table entries associated with the one or more pages to indicate the migrating and updating page table entries associated with the one or more other pages to indicate the sending; and powering off the first portion of the internal memory.

12. A system comprising:
a processor comprising:
- a first domain including a plurality of cores each to independently execute instructions;
- a second domain including at least one graphics engine to independently perform graphics operations;
- a sensor hub coupled to the first domain and to interface with at least one sensor to couple to the processor;
- a memory associated with the sensor hub and having a plurality of portions;
- a memory management unit including a page manager to access page table information and to update a database associated with the memory based on the page table information; and
- a power controller including a first logic to dynamically power down at least one of the plurality of portions of the memory based at least in part on usage information stored in the database regarding the at least one of the plurality of portions of the memory; and a platform memory coupled to the processor, the platform memory separate from the memory.

13. The system of claim 12, wherein the sensor hub comprises an integrated sensor hub, the integrated sensor hub including the memory.

14. The system of claim 12, wherein the first logic is to dynamically reduce a size of an active portion of the memory without reference to workload information regarding the sensor hub.

15. The system of claim 12, wherein the memory management unit is included in the first domain of the processor, the first domain separate from the sensor hub, and wherein the database is to be stored in a portion of the memory.

16. The system of claim 12, wherein the page manager is to access a page table address stored in an entry of a page directory, the page table address used to access a page table including a plurality of page table entries, wherein the page manager is to access the page table information from a first entry of the plurality of page table entries and to update a use count of an entry of the database associated with a page of the memory associated with the first entry of the plurality of page table entries.

* * * * *